US010509871B2

(12) United States Patent
Fertig et al.

(10) Patent No.: US 10,509,871 B2
(45) Date of Patent: Dec. 17, 2019

(54) MAINTAINING COMPUTATIONAL FLOW IN A DATA-DEPENDENT CONSTRAINT NETWORK

(71) Applicant: The Boeing Company, Chicago, IL (US)

(72) Inventors: Kenneth W. Fertig, Palo Alto, CA (US); Sudhakar Y. Reddy, Santa Clara, CA (US)

(73) Assignee: THE BOEING COMPANY, Chicago, IL (US)

( * ) Notice: Subject to any disclaimer, the term of this patent is extended or adjusted under 35 U.S.C. 154(b) by 446 days.

(21) Appl. No.: 15/437,528

(22) Filed: Feb. 21, 2017

(65) Prior Publication Data

US 2018/0239847 A1     Aug. 23, 2018

(51) Int. Cl.
*G06F 7/60*     (2006.01)
*G06F 17/10*     (2006.01)
*G06F 17/50*     (2006.01)

(52) U.S. Cl.
CPC ...... *G06F 17/5009* (2013.01); *G06F 2217/06* (2013.01); *G06F 2217/16* (2013.01)

(58) Field of Classification Search
None
See application file for complete search history.

(56) References Cited

U.S. PATENT DOCUMENTS

2014/0107987 A1* 4/2014 Fertig ............... G06F 17/5095
703/2

OTHER PUBLICATIONS

Reddy, Sudhakar Y. et al., "Constrained Exploration of Trade Spaces", 2006, 2nd IEEE International Conference on Space Mission Challenges for Information Technology, IEEE. (Year: 2006).*
Reddy, Sudhakar Y. et al., "Design Sheet: A System for Exploring Design Space", 1996, Artificial Intelligence in Design '96, Kluwer Academic Publishers. (Year: 1996).*
Thiebaux, Sylvie, "Decision-Theoretic Planning with a Possible Models Action Formalism", 1994, AAAI Technical Report, AAAI. (Year: 1994).*
Sanko, Jelena et al., "Differential Evolutionary Approach Guided by the Functional Constraint Network to Solve Program Synthesis Problem", 2010, IEEE. (Year: 2010).*

* cited by examiner

*Primary Examiner* — Cedric Johnson
(74) *Attorney, Agent, or Firm* — MH2 Technology Law Group LLP

(57) ABSTRACT

Presented are methods for determining computational flow for a data-dependent constraint network that are especially useful for modeling and trading off alternative configurations in a single computational environment, during design analysis and optimization of an engineering system. These methods leverage a preexisting constraint management system that uses a bipartite graph of variables and constraints to model an engineering system and employ logic formulae based world sets to determine the applicability of the constraints to different system configurations. These methods ensure that a data-dependent constraint network is in a consistent state, and are the essential foundation for other techniques that rely on a consistent constraint network to produce computational plans for propagating values and uncertainties through the constraint network during tradeoff analyses.

20 Claims, 16 Drawing Sheets

| World Set: WFF (Well-Formed Formula defining a set of worlds) | Worlds | Venn Diagram |
|---|---|---|
| True | All Worlds | Q: S=s1 X, S=s2 X, S=s3 X / Not(Q): S=s1 X, S=s2 X, S=s3 X |
| Q | {Q and S=s1, Q And s=s2, Q And S=s3} | Q: S=s1 X, S=s2 X, S=s3 X / Not(Q): |
| Not(Q) | {Not(Q) and S=s1, Not(Q) And s=s2, Not(Q) And S=s3} | Q: / Not(Q): S=s1 X, S=s2 X, S=s3 X |
| S=s1 | {Q And S=s1, Not(Q) and S=s2} | Q: S=s1 X / Not(Q): S=s1 X |
| Q And S=s1 | {Q And S=s1} | Q: S=s1 X / Not(Q): |
| Q AND (S=s1 Or S=s3) | {Q And S=s1, Q And S=s3} | Q: S=s1 X, S=s3 X / Not(Q): |
| False | No Worlds | Q: / Not(Q): |

FIG. 5

MAINTAINING COMPUTATIONAL FLOW IN A DATA-DEPENDENT CONSTRAINT NETWORK

TECHNICAL FIELD

The present teachings relate to the field of constraint networks and, more particularly, to the maintaining computational flow in a data-dependent constraint network.

BACKGROUND

In the early design phase of complex engineering systems, models are usually made up of a set of equations (i.e., equality constraints) among all the design variables in the system. This set of equations forms a constraint network. An algebraic constraint management system ("CMS") can be used to robustly solve the set of equations in the constraint network, to conduct trade studies, and to evaluate the performance and affordability metrics modeled by the constraint network.

The constraint management system historically has had difficulty solving a set of equations that model alternative engineering system configurations (e.g., a data-dependent constraint network, where the equations that are active depend upon the configuration under study). What is needed is an improved constraint management system and method for maintaining computational flow in a data-dependent constraint network.

SUMMARY

The following presents a simplified summary in order to provide a basic understanding of some aspects of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

Systems and methods for determining computational flow for a data-dependent constraint network for use during at least one of design analysis and design optimization of an engineering system are disclosed. The method includes electronically constructing and storing a bipartite graph representing the data-dependent constraint network. The bipartite graph includes a plurality of variable nodes and a plurality of relation nodes. The variable nodes and the relation nodes are interconnected by arcs. The variable nodes represent variables in a mathematical model of the engineering system. The relation nodes define constraints between possible values of the variables. A world set defines conditions on the relation nodes that determine the applicability of the constraints during the at least one of design analysis and design optimization of the engineering system. The world set is recorded for each user-selected variable node in which the variable is considered to be independent. A plurality of world-set dependent attributes are determined and recorded for each of the variable nodes, the relation nodes, the arcs, the bipartite graph, or a combination thereof. The world-set dependent attributes include flow-states of the variable nodes, inflows of the variable nodes, outflow arcs of the relation nodes, directions of the arcs, over-constrained relation nodes for the bipartite graph, or a combination thereof. The method also includes updating world-set dependent directions for the arcs, world-set dependent inflows for the variable nodes, world-set dependent outflow arcs for the relation nodes, or a combination thereof such that the data-dependent constraint network is in a consistent state, such that at most one of the arcs is pointing to each variable node in any world, and at least one of the arcs is directed from one of the relation nodes to one of the variable nodes in a non-null world. The method also includes outputting electronically, for each variable node, the flow-states of each variable node in all worlds comprising an enabling world set of each variable node.

The features, functions, and advantages that have been discussed can be achieved independently in various implementations or may be combined in yet other implementations further details of which can be seen with reference to the following description and drawings.

BRIEF DESCRIPTION OF THE DRAWINGS

The accompanying drawings, which are incorporated in and constitute a part of this specification, illustrate the present teachings and together with the description, serve to explain the principles of the disclosure. In the figures:

FIG. 5 depicts a table showing several exemplary world sets.

It should be noted that some details of the Figures have been simplified and are drawn to facilitate understanding of the present teachings rather than to maintain strict structural accuracy, detail, and scale.

DETAILED DESCRIPTION

Reference will now be made in detail to examples of the present teachings, which are illustrated in the accompanying drawings. Wherever possible, the same reference numbers will be used throughout the drawings to refer to the same or like parts.

Figure 1:
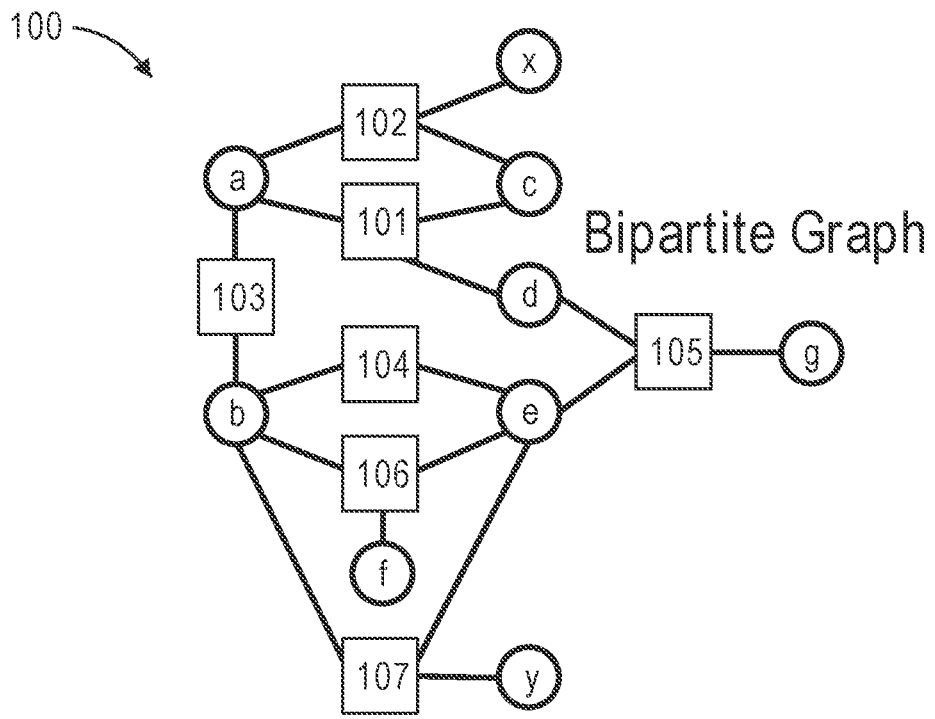
FIG. 1 depicts a schematic view of a bipartite graph with undirected arcs.

The embodiments described herein provide a system and method for maintaining computational flow in a data-dependent constraint network. FIG. 1 depicts a schematic view of a bipartite graph 100. The bipartite graph 100 is a structure that represents the connectivity between nodes in a constraint network. The bipartite graph 100 may include two types/flavors of nodes (shown in the example: equations 101-107 and variables a-g, x, y). Although seven equations 101-107 and nine variables a-g, x, y are shown, it will be appreciated that the number of equations and variables may vary and may, in some instances be much larger (e.g., hundreds or thousands) than shown in the example graph 100.

Illustrative equations 101-107 may be or include:

$$101: a\char`\^2+d*\mathrm{Exp}(c-2)=2*c \tag{1}$$

$$102: c+x=2*a*\mathrm{Log}(a+1)/\mathrm{Log}(2) \tag{2}$$

$$103: a+b=3 \tag{3}$$

$$104: e\char`\^2-2*b*e+b\char`\^2=1 \tag{4}$$

$$105: e*g\char`\^2=16*(d-2) \tag{5}$$

$$106: e*b*f=e+b+f \tag{6}$$

$$107: 2*b-e=y \tag{7}$$

The bipartite graph 100 may also include arcs (e.g., the lines connecting equations and variables). The arcs exist only between nodes of different flavors. Thus, an arc may exist between a variable and an equation but not between two equations and not between two variables. The arcs indicate what variables are in each equation. For example, variables a, c, and d are in equation 101.

Figure 2:
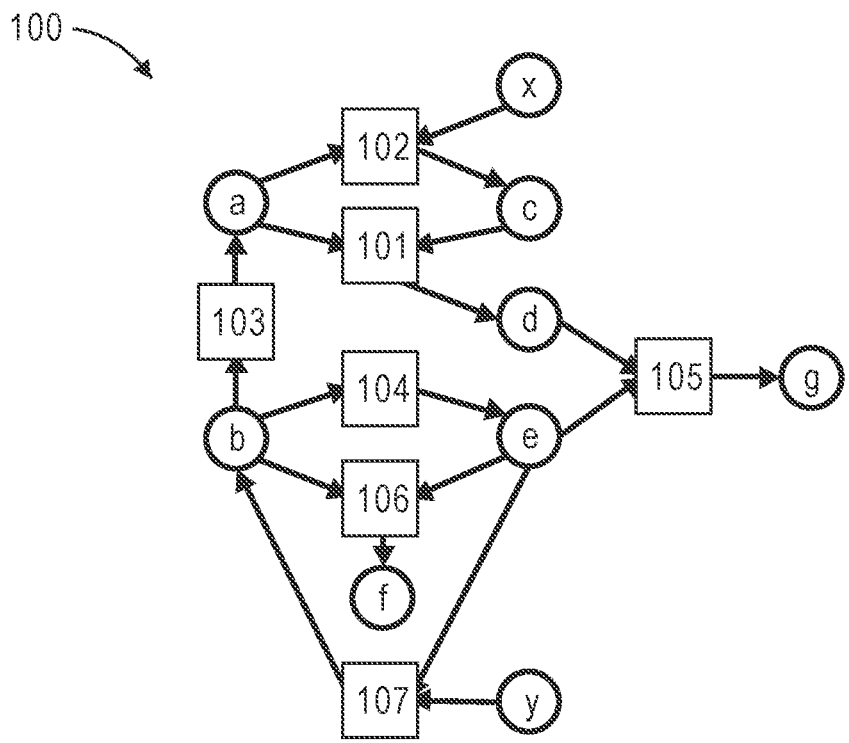
FIG. 2 depicts the bipartite graph with directional arcs.

FIG. 2 depicts the bipartite graph 100 showing directional arcs. Flow refers to a direction of an arc in the bipartite graph 100. The flow indicates that each equation is associated with one and only one variable that it is defining. In the bipartite graph 100, there are two more variables than equations. The user may decide which two variables are independent, under certain consistency constraints. Such variables may have outgoing arcs only. In FIG. 2, x and y are the independent variables. The flow algorithm then assigns an equation to each of the remaining variables. The arc direction for a consistent network may be unique, except for internal cycles or strong components of the graph 100. As used herein, a strong component refers to a maximally-connected sub-graph in which there is a directed path from each node in the sub-graph to each other node in the sub-graph.

The engineering system may be or include a physical object or an organization of physical objects. The physical object may be or include an aircraft, a spacecraft, a launch vehicle, a ground vehicle, a marine vehicle, an autonomous vehicle, or a weapons system. The organization of physical objects may be or include a combat system, a civic organization, or a fleet of autonomous vehicles. A civic organization refers to resource allocation and/or optimization studies for things such as an airport, a city's emergency response organization, utility energy distribution systems, or anything that involves the expenditure of funds to achieve a purpose in the civic realm. In some embodiments, the set of possible engineering system design concepts may include architectural alternatives that require separate modeling equations in the constraint network to properly evaluate the performance and cost metrics of the alternative concepts of the engineering system being designed. Conventional constraint networks are data-independent. This means that they are effectively static when dealing with architectural alternatives. Thus, the architectural alternatives cause each of the alternative computational paths to be simultaneously active. As used herein, a computational path to determine the values of one or more variables in a set O from the values of one or more variables in a set I refers to the ordered path from the vnodes in set I to the vnodes in set O. For example, the computational path in FIG. 2 from the vnode set I={x} to the vnode set O={g} consists of using equation 102 to compute c, then equation 101 to compute d, and finally equation 105 to compute g. To actually execute this path, one needs the values of "stubbed upstream" vnodes a and e. As a result, the topology of the data-independent constraint network may be needlessly complex, which more easily leads to coding errors. In addition, unnecessary computations may be performed.

Figure 3:
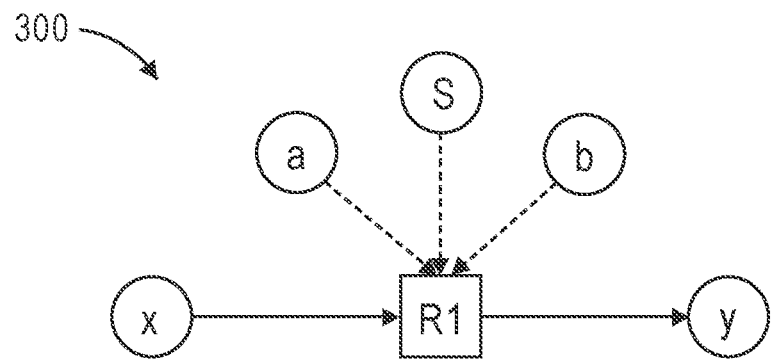
FIG. 3 depicts a schematic view of a portion of a different bipartite graph modelling a data-independent constraint network.

FIG. 3 depicts a schematic view of a portion of a different bipartite graph 300 modelling a data-independent constraint network. In the bipartite graph 300, R1 may be, for example, $$R1: y=\mathrm{Case}(S,\{s1,a*x\},\{s2,b*x\}) \tag{8}$$

There may be one equality constraint among the five variables: S, a, b, x, y. The arcs connecting S, a, and b to R1 in this figure are dotted to indicate that they are "forced" into the node R1 in the sense that R1 cannot be used to compute their values.

An alternative representation is to allow the constraint network topology to be data-dependent in the sense that certain equations are "active" only when certain variables take on specified values. Thus, in data-dependent constraint networks, only certain alternative computational paths are active at a time. As a result, many of the equations in a non-data-dependent constraint network may be simplified, leading to fewer coding errors. No unnecessary computations are performed. In data-dependent constraint networks, a constraint is active only when a Boolean condition is satisfied. Such conditions may be assigned manually or automatically.

Figure 4:
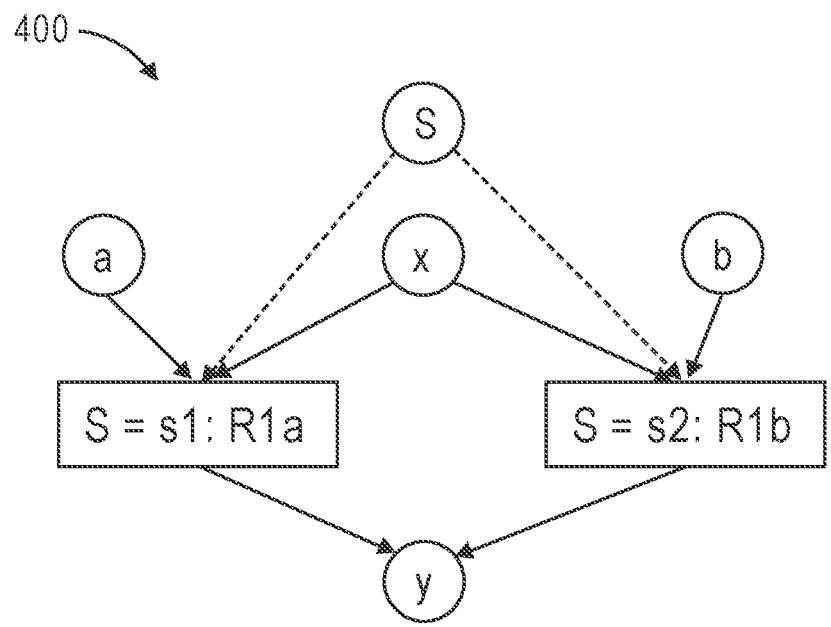
FIG. 4 depicts a schematic view of a portion of a different bipartite graph modelling a data-dependent constraint network.

FIG. 4 depicts a schematic view of a portion of a different bipartite graph 400 modelling a data-dependent constraint network. In the bipartite graph 400, $$R1a: y=a*x: \mathrm{If}\ S=s1 \tag{9}$$

$$R1b: y=b*x: \mathrm{If}\ S=s2 \tag{10}$$

There may be two equality constraints among the five variables: S, a, b, x, y. R1a is active if S=s1. R2a is active if S=s2. The variable S is called a state variable. State variables are variables that are used for the enabling conditions of equations. The state variables may be of two types: Boolean variables and categorical variables that are defined over a finite domain (i.e., a set of states). State variable are allowed to have discrete values over a finite set known to the constraint management system. Only S is "forced" into relation nodes R1a and R1b. Vnodes a and b are no longer forced and are thus available for "reverse" computation depending only on the topology of the relevant computational paths. In particular, in a data-dependent network, each equation node and variable node is associated with an enabling condition, which specifies under what conditions that entity is useable for computations in the constraint network.

A world refers to a complete specification of the value of all state variables in a model. In one example, a model includes two state variables: Q and S. If Q is a Boolean variable, and S is a discrete variable with the possible values {s1, s2, s3}, then there are six possible worlds:

$$1.\ Q\ \text{And}\ S=s1 \qquad (11)$$

$$2.\ Q\ \text{And}\ S=s2 \qquad (12)$$

$$3.\ Q\ \text{And}\ S=s3 \qquad (13)$$

$$4.\ \text{Not}(Q)\ \text{and}\ S=s1 \qquad (14)$$

$$5.\ \text{Not}(Q)\ \text{and}\ S=s2 \qquad (15)$$

$$6.\ \text{Not}(Q)\ \text{And}\ S=s3 \qquad (16)$$

A world set refers to a set of worlds. It is defined by a well-formed formula ("WFF") involving state variables. The table 500 in FIG. 5 illustrates several exemplary world sets.

In data-dependent networks, there may be a finite set of state variables. The state variables may have values that are used to define alternative configurations and computations. In at least one embodiment, the state variables may describe a physical object. The object may be, for example, an aircraft (e.g., an airplane, a helicopter, a drone, a spacecraft, etc.), a vehicle (e.g., a car, a truck, a motorcycle, etc.), an engineering component (e.g., an automobile brake system, drive train, engine, etc.), a military configuration (e.g. a deployment of troops with various levels of equipment, etc.), a network (e.g. for communication, electrical transmission, etc.), or the like. Illustrative state variables describing an aircraft may be engine type (e.g., turbojet, ramjet, rocket, etc.), whether a canard is present (e.g., a Boolean variable having a value of T or F), the material (e.g., composite, aluminum, titanium, etc.), the control type (e.g., auto-flow control, hydraulic flaps, etc.), manufacturing method (e.g., robotic assembly, autoclave type, etc.), or the like.

A first-order logic formula may be: ((engine type=rocket) OR (engine type=turbojet) AND (a canard is present)). If a state value is not mentioned in a logic formula, all values of that state variable may be allowed. The set of all worlds is T (true world set). The set of no worlds is F (empty world set).

When dealing with non-data-dependent constraint networks, each variable may have at most one incoming arc. The equation associated with that incoming arc is that variable's defining equation. Variables with all outgoing arcs and no incoming arcs are independent. Each equation node has exactly one outgoing arc pointing to the variable to which it is matched.

The max-flow algorithm for bipartite graphs may also be called maximum bipartite matching. The max-flow algorithm matches an equation node with a variable node. If there are unmatched equation nodes left after algorithm completion, then the network is over-constrained. For example, the three equations below over-constrain the variables x and y. One possible match is equation 1 to x, equation 2 to y, and equation 3 is unmatched.

$$[1]\ x+y=10 \qquad (17)$$

$$[2]\ x-y=0 \qquad (18)$$

$$[3]\ x+2*y=3 \qquad (19)$$

In a data-dependent network, each node may be associated with an enabling world set. This may be a first-order logic formula such as (canard is present) AND (engine type=rocket). The truth value is dependent upon the value of state variables in the network. When true, the node is available for computation in worlds encompassed by its world set. When false, the node cannot participate in a computation in the worlds encompassed by its world set. Data-dependent features may be managed using the concept of a data-dependent attribute, which associates world sets (e.g., $ws_j$) with attribute values (e.g., $value_j$). For example, $\{ws_1 \rightarrow value_1, ws_2 \rightarrow value_2, \ldots\}$. A multi-valued arc direction may be represented as a data-dependent attribute. For example, $$(Q\ \text{and canardpresent} \rightarrow \text{directed to equation}) \qquad (20)$$

$$(Q\ \text{and Not(canardpresent)} \rightarrow \text{directed to variable}) \qquad (21)$$

$$\text{Not}(Q) \rightarrow \text{undirected} \qquad (22)$$

The world sets, in a data-dependent attribute, are a partition of the enabling world set of the node with which it is associated. For example, $$\bigcup_i ws_i = ws_{enabling\ (node)},\ ws_j \cap ws_k = F,\ j \neq k.$$

The values in a world set attribute are distinct. For example, $value_j \neq value_k$, $j \neq k$.

The equation nodes may have one or more data-dependent attributes. In one embodiment, the data-dependent attributes may be or include outflow, number of undirected arcs, intended variables, graphs (e.g., bipartite graphs), and unusable directions. The outflow identifies which arcs are outgoing in which world sets. The number of undirected arcs identifies the number of arcs that are undirected in different world sets. The intended variables data-dependent attribute maps world sets to a variable that is the natural output of the equation in that world set. This may be useful to simplify model creation. By default, if the equation has a single variable on its left hand side, it is assumed to be the equation's intended variable in all worlds for which the equation is enabled. The graphs data-dependent attribute maps world sets to the strong component that this equation is in for the given world set. This includes the top-level graph in this mapping. The unusable directions data-dependent attribute maps world sets to lists of variables considered unusable as output variables for this equation in the given world set.

The variable nodes may also have one or more data-dependent attributes. In one embodiment, the data-dependent attributes may be or include inflow, status, and graphs (e.g., bipartite graphs). The inflow specifies a world-set dependent value, either independent or an arc that is directed to this variable and thus specifies the defining equation for the variable value in the given world set. The status specifies the world-set dependent status of the variable. Possible values for status are inflow (i.e., whether the variable has an inflow arc), forced inflow (i.e., whether the variable has an arc that is forced by the user semantics to be an inflow arc, and determined (i.e., the variable is either independent or has an inflow, and all the predecessor nodes are determined to be either independent or have inflow). The graph specifies the world-set dependent graphs of which this variable is a member. These graphs are either different strong components or the top-level graph.

The top-level bipartite graph may be managed through an object named "Graph." The object "Graph" may have the following attributes: arcs, variable nodes (i.e., Vnodes), and equation nodes (i.e., Rnodes). An incremental version of the max-flow algorithm may be used to manage the data-dependent attributes. When an equation with its enabling world set is added to the constraint network, the following may occur. The Rnode data structure may be created that represents the equation, and it may be added to the Rnodes listed in the graph. This may initialize the Rnode's enabling world set. In addition, Vnode structures may be created for variables in the equation that have not yet been created. The Vnode structures may be added to the Vnodes list in the graph. This may initialize/update the enabling world set for the Vnodes in this equation. In addition, an undirected arc may be created between the Rnode and the Vnode in the equation. The undirected arc may be added to the arcs list in the graph. In addition, the flow of the graph may be updated by finding a place to push the output of the Rnode in each world encompassed by the equation's enabling world set. Specifically, the outflow data-dependent attribute of the Rnode may be determined in this step. If an outflow is found for each world, the graph may still be consistent. If not, the user may be informed that the model is over-constrained.

Initially, if the arc's variable has inflow in a given world set, the arc is directed toward the equation Rnode in that world set, and it is left undirected in other world sets. After one or more of the Rnode's arcs have been added to the graph, the graph's flow is updated using the procedure PropagateFlow(Rnode, &Optional WorldSet). This consistently directs/redirects each of the arcs in the graph so that all Rnodes have outflows in their enabling world sets. Specifically, the outflow data-dependent attribute $\{ws_1 \rightarrow arc_1, ws_2 \rightarrow arc_2, \ldots\}$ of each Rnode is such that the union of the world sets in the outflow attribute is equal to the Rnode's enabling world set. For example, $$\bigcup_i ws_i = ws_{enabling\ (rnode)}.$$

The propagate flow algorithm may include Propagate-Flow(rnode, &optional world-set). This routine propagates the flow in the graph starting with the Rnode and returns the consequences of this propagation. The consequences may be or include success data-dependent outflow (e.g., $\{ws_1 \rightarrow arc_1, ws_2 \rightarrow arc_2, \ldots\}$) for successful propagation. Each $arc_j$ is the outflow of the Rnode $ws_j$. The consequences may also include the world sets where the propagation failed. This informs the user that the network is over-constrained for this world set.

The steps in the propagate flow algorithm may generally include those set forth below. The propagate flow algorithm may include:

1—unless world set is provided, world set=EnablingWorldSet(Rnode).
2—{success-consequences, failed-world-set} PropagateFlow1(Rnode, world set).
3—When Not(failed-world-set=false), UpdateNoflow (Rnode, failed-world-set). This may update the data-dependent no flow attribute of the graph, which keeps track of which Rnodes are associated with over-constrained situations in which world sets.

A series of flowcharts are provided below. The flowcharts may include one or more objects/entities such as graphs, modes, vnodes, arcs, EnablingWorldSets(object), data-dependent-attributes, InflowAttributes(Vnode), ArcDirectionMap(arc), Rnode(arc), Vnode(arc), and Arcs(node). The graph may have pointers to its relation nodes, variable nodes, and arcs between them. The graph may also have a data-dependent attribute specifying over-constrained relations in the graph. The mode may be a relation node in the graph. The mode may have pointers to its enabling world set and data-dependent attributes including its arcs and outflow arcs. The vnode may be a variable node in the graph. The vnode may have pointers to its enabling world set and data-dependent attributes including arcs and inflow arcs. An arc may connect a vnode to an mode. The arc may have a pointer to the vnode and/or the mode as well as its enabling world-set data-dependent attribute providing the arc direction. The EnablingWorldSet(object) is a world set in which an object is active. As used herein, active refers to being available for computation. This world set may include all of the worlds in which the object of interest is in the graph. Its complement includes the worlds in which the object no longer participates in the graph.

The data-dependent attribute is an attribute of an object that is world-set dependent. The data-dependent attribute may be represented as an association last, $\{ws[1] \rightarrow value[1], ws[2] \rightarrow value[2], \ldots\}$ with the property that the world sets, ws[j], are mutually disjoint, the values, value[j], are unique, and the union of the ws[j] may equal the enabling world set of the object to which the data-dependent attribute belongs. The InflowAttribute(vnode) is a world-set-dependent attribute giving the inflows to the variable node, vnode. These may be arcs or a code word (e.g., independent), with the latter indicating that the vnode is independent in the associated world set. The ArcDirectionMap(arc) is the world-set-dependent attribute for the arc. For example, $\{ws[1] \rightarrow vnode, ws[2] \rightarrow mode, ws[3] \rightarrow NIL$, with NIL meaning that the arc is undirected in ws[3]. The Rnode(arc) is a relation node associated with the arc. The Vnode(arc) is a variable node associated with the arc. The arcs(node) is a list of all arcs connected to the node, which is either a relation node or a variable node.

The propagate flow algorithm uses methods that find the value of a world-set-dependent attribute in a given world or to test if the world-set-dependent attribute has a specified value in a given world. One such method is Independent (world-set, vnode), which returns true if the vnode is independent in the given world-set.

Figure 6:
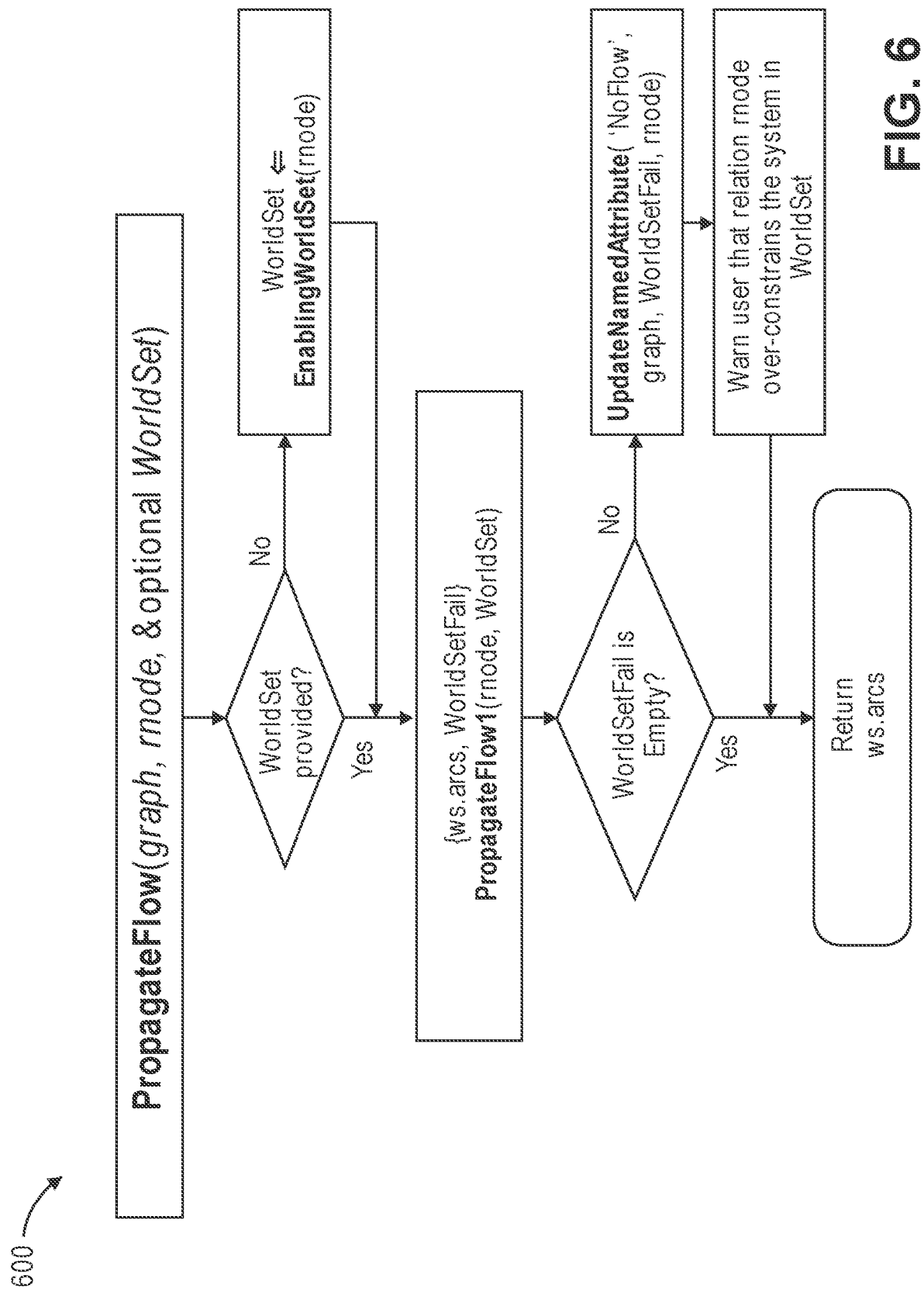
FIG. 6 depicts a flowchart of a method for propagating flow in a data-dependent constraint network.

FIG. 6 depicts a flowchart of a method 600 for propagating flow in a data-dependent constraint network. The method 600 may include propagating flow in the graph starting with an mode and returning the consequences of this propagation. The consequences may be or include success data-dependent outflows (e.g., $ws_1 \rightarrow arc_1, ws_2 \rightarrow arc_2, \ldots\}$ for successful propagation. Each $arc_j$ is the outflow of the mode in $ws_j$. The consequences may also be or include the world set where the propagation failed. This may inform the user that the network is over-constrained for this world set.

The method 600 may include:
1—Unless the world set is provided, worldset=EnablingWorldSet(rnode).
2—{ws.arcs, WorldSetFail} PropagateFlow1(mode, worldset).
3—When Not(WorldSetFail=False), UpdateNamedAttribute('NoFlow', graph, WorldSetFail, mode).

This may update the data-dependent no-flow attribute of the graph, which keeps track of which modes are associated with over-constrained situations and in which world sets.

Figure 7A:
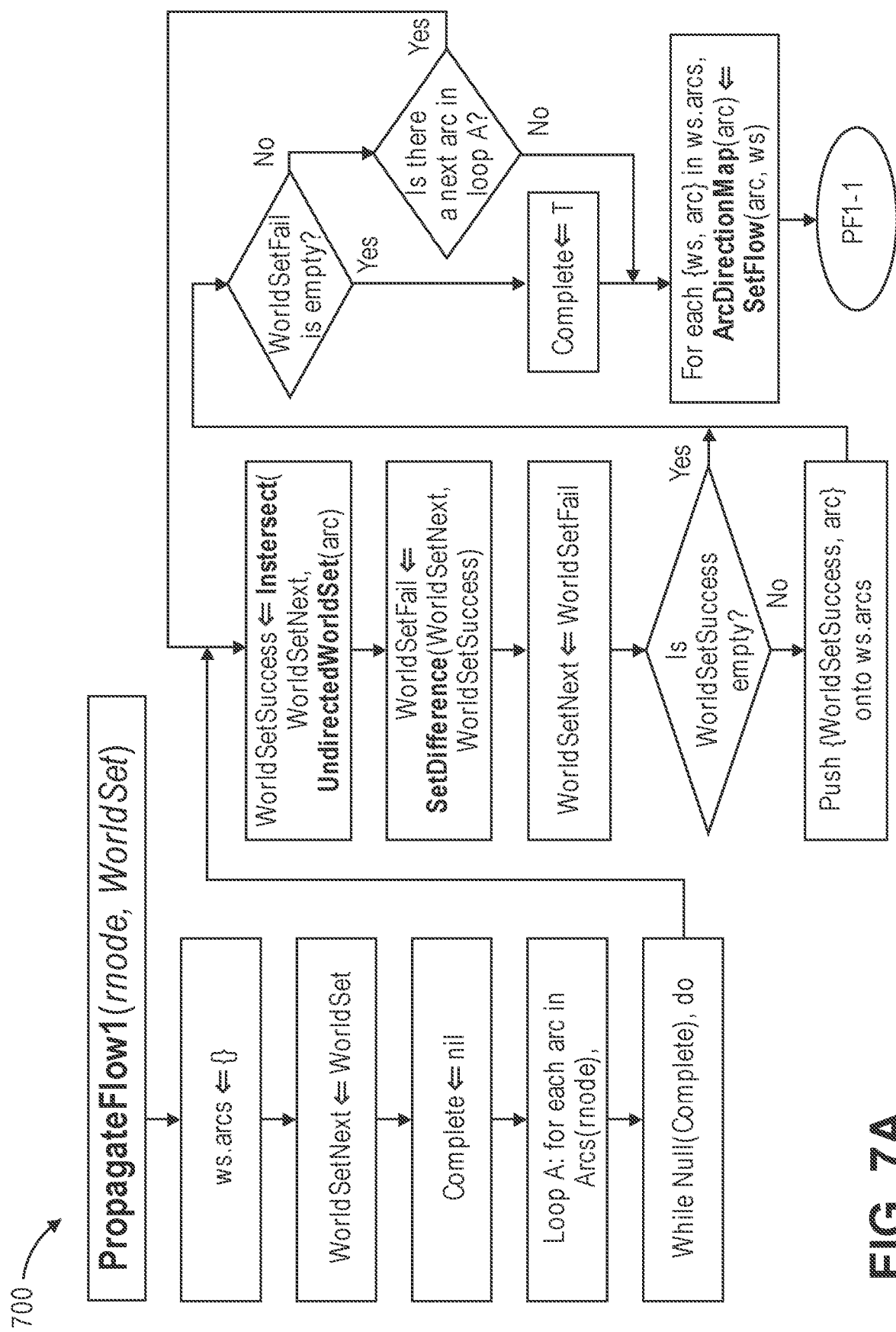
FIGS. 7A and 7B depict a flowchart of a supporting method for propagating flow in a data-dependent constraint network.
Figure 7B:
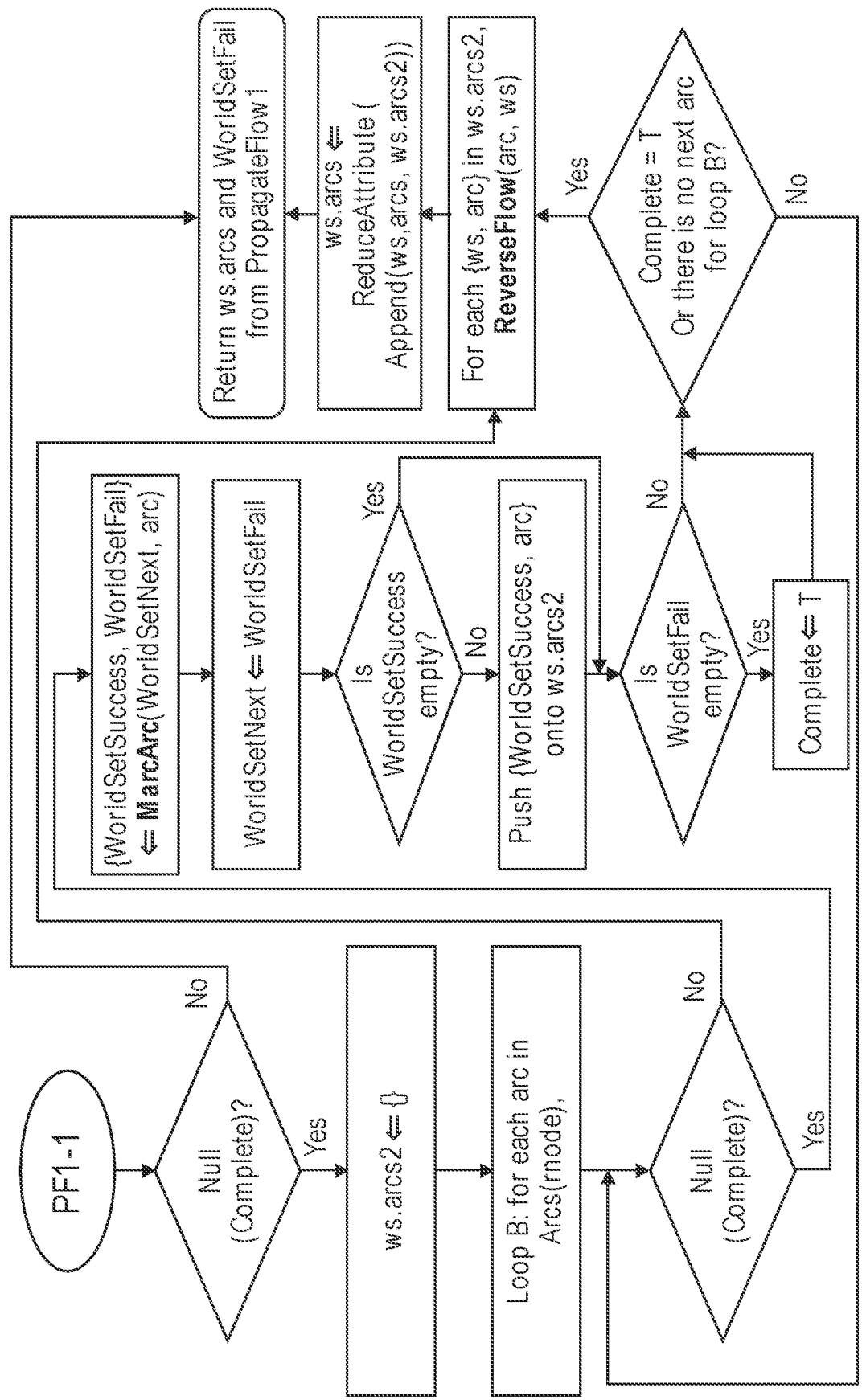

FIGS. 7A and 7B depict a flowchart of another method 700 for propagating flow in a data-dependent constraint network. The method 700 may include propagating flow in a specified world set starting with the mode. This returns a data-dependent attribute of world sets pointing to outflow arcs for the mode. This is a recursive method, calling itself in the procedure MarcArc when arc reversal is required. The method 700 may include:

1—ws.arcs={ }. Initialize ws.arcs to the empty list. This may be a data-dependent attribute of {world set, arc} associations given an outflow arc of the mode for each paired world set.
2—WorldSetNext=WorldSet. This is the evolving world set. It may be partitioned to find outflow arcs for the partitioned elements.
3—Complete=nil. This is used to test when this step is complete; initialized to nil, meaning not done.
4—For each arc in Arcs(mode):
    4.1—While null(Complete), do the following:
        4.1.1—Determine WorldSetSuccess and WorldSetFail. WorldSetSuccess=the intersection of WorldSetNext with WorldSet in the arc-direction WorldSet attribute of the arc that is associated with being undirected. WorldSetFail is the set difference between WorldSetNext and WorldSetSuccess. This latter world set encompasses the worlds in which there is no undirected arc.
        4.1.2—Set WorldSetNext=WorldSetFail. This is the world set in which the flow of one or more arcs is reversed.
        4.1.3—Unless WorldSetSuccess=empty, push {WorldSetSuccess, arc} onto ws.arcs.
        4.1.4—When WorldSetFail=empty, set Complete=T.
    4.2—If Complete=T or loop over Arcs(rnode) is exhausted, go to 5 below. If not, get the next arc in Arcs(rnode) and loop back to 4.1.
5—For each {ws, arc} in ws.arcs, call the procedure SetFlow(arc, ws). This procedure may do the bookkeeping associated with setting an arc direction in a world set.
6—When Null(Complete). At this point, the method is in a WorldSetNext for which the NumberUndirectedArcs(rnode) is zero. In other words, there are no undirected arcs left on this mode where the outflow in the WorldSetNext can be pushed. The method, therefore, seeks a map item $ws_j$ $arc_j$ where the flow of $arc_j$ in $ws_j$ can be reversed so that $arc_j$ can be an outflow arc of the mode in the world set $ws_j$.
    6.1—ws.arcs2={ }. This initializes this to the empty list. It will be adjoined to data-dependent outflow attributes of the mode when complete.
    6.2—For arc in Arcs(rnode):
        6.2.1—While Null(Complete). Here, the method is searching for arc reversals.
            6.2.1.1—Determine WorldSetSuccess and WorldSetFail using MarkArc(WorldSetNext, arc). This procedure partitions WorldSetNext into two pieces: WorldSetSuccess and WorldSetFail, where one can propagate flow out of the vnode attached to the arc in WorldSetSuccess, but not in WorldSetFail. This routine will recur through PropagateFlow1 when arc reversal is performed.
            6.2.1.2—Set WorldSetNext=WorldSetFail. This is the world set in which some arcs will have their flow reversed.
            6.2.1.3—Unless WorldSetSuccess=empty, push {WorldSetSuccess, arc} onto ws.arcs2.
            6.2.1.4—When WorldSetFail=empty, set Complete=T.
        6.2.2—If Complete=T or loop over Arcs(rmode) is exhausted, go to 6.3. Otherwise, find the next arc in Arcs(rnode) and loop back to 6.2.1.
    6.3—For each {$ws_j$, $arc_j$} is ws.arcs2, call procedure ReverseFlow($ws_j$ $arc_j$). This reverses the flow on each $arc_j$, causing it to be an outflow arc for mode in $ws_j$.
    6.4—Set ws.arcs=Append(ws.arcs, ws.arcs2) and call ReduceWorldSetAttribute on it to coerce it onto a proper world set attribute so that it would sets are disjointed, and its values are unique.
7—Return ws.arcs and wsFail from PropagateFlow1.

Figure 8A:
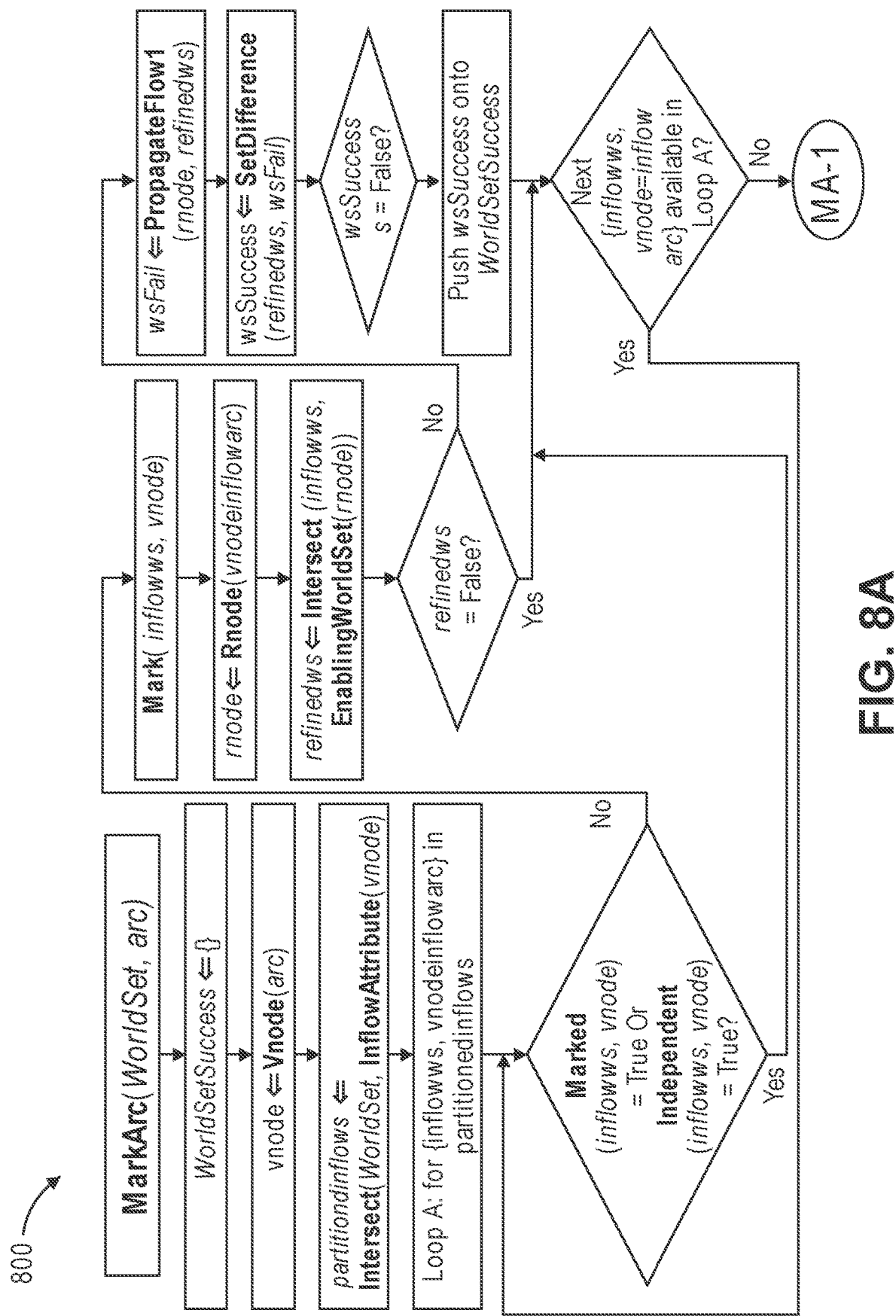
FIGS. 8A and 8B depict a flowchart of a method for marking an arc.
Figure 8B:
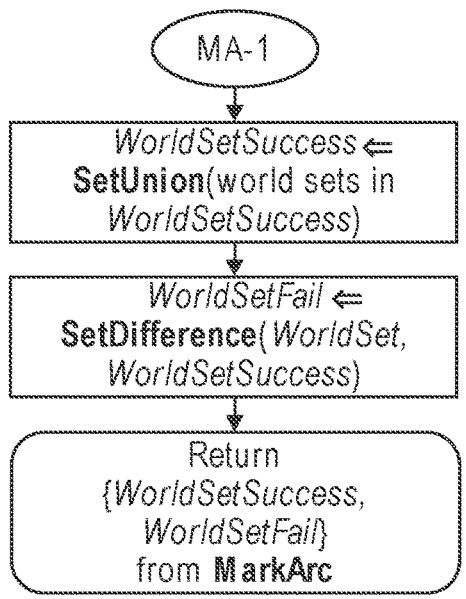

FIGS. 8A and 8B depict a flowchart of a method 800 for marking an arc. The method 800 may partition a WorldSet into two pieces: WorldSetSuccess and WorldSetFail, where one can propagate flow out of the vnode associated with the arc in WorldSetSuccess, but not in WorldSetFail. It should be noted that And(WorldSetSuccess, WorldSetFail)=NIL (i.e., their intersection is empty and so evaluates to False), and OR(WorldSetSuccess, WorldSetFail)=WorldSet. (.i.e., their union is WorldSet.) This method 800 returns two values. The first is success-Worldset, a WorldSet in which the arc can be marked (i.e., reversed). The second is the complement of the success-WorldSet with the incoming WorldSet.

The method 800 includes:
1—Set WorldSetSuccess=NIL; Initialize to False.
2—Set vnode=Vnode(arc).
3—Set partitioned-inflows=Intersect WorldSet with inflow data-dependent attribute of vnode.
4—For {inflow-ws, vnode-inflow-arc} in partitioned-inflows, do the following:
    4.1—Unless Marked(inflow-ws, vnode) or Independent(inflow-ws, vnode), do the following (unless this have been searched already or the vnode is declared independent of this world set):
        4.1.1—Mark (inflow-ws, vnode). This vnode is now being visited in inflow-ws.
        4.1.2—Set mode=Rnode(vnode-inflow-arc).
        4.1.3—refined-ws=intersect inflow-ws with EnablingWorldSet(rnode).
        4.1.4—Unless refined-ws=False, recur by calling Propagateflow1 (refined–ws, mode) to return wsFail, the world in which the arcs cannot be reversed.
            4.1.4.1—Set wsSuccess=SetDifference(refined–ws, wsFail).
            4.1.4.2—Unless wsSuccess=False, Push wsSuccess onto WorldSetSuccess.
        4.1.5—Unless the loop is exhausted, get the next pair {inflow-ws, inflow-arc pair} and loop back to 4.1. Otherwise, proceed to 5.
5—Set WorldSetSuccess=SetUnion of World Sets in WorldSetSuccess.
6—Set WorldSetFail=SetDifference(WorldSet, WorldSetSuccess).
7—Return{WorldSetSuccess, WorldSetFail} from MarcArc.

Mark(WorldSet, object, Optional value) sets the data-dependent "marked" attribute of the object for the specified WorldSet to "value", which defaults to true (T) if not provided. Marked(WorldSet, object) returns the WorldSet value associated with the data-dependent marked attribute of object, if present. Unmark(Worldset, object) unmarks the data-dependent marked attribute of object for WorldSet by setting it to nil.

Figure 9A:
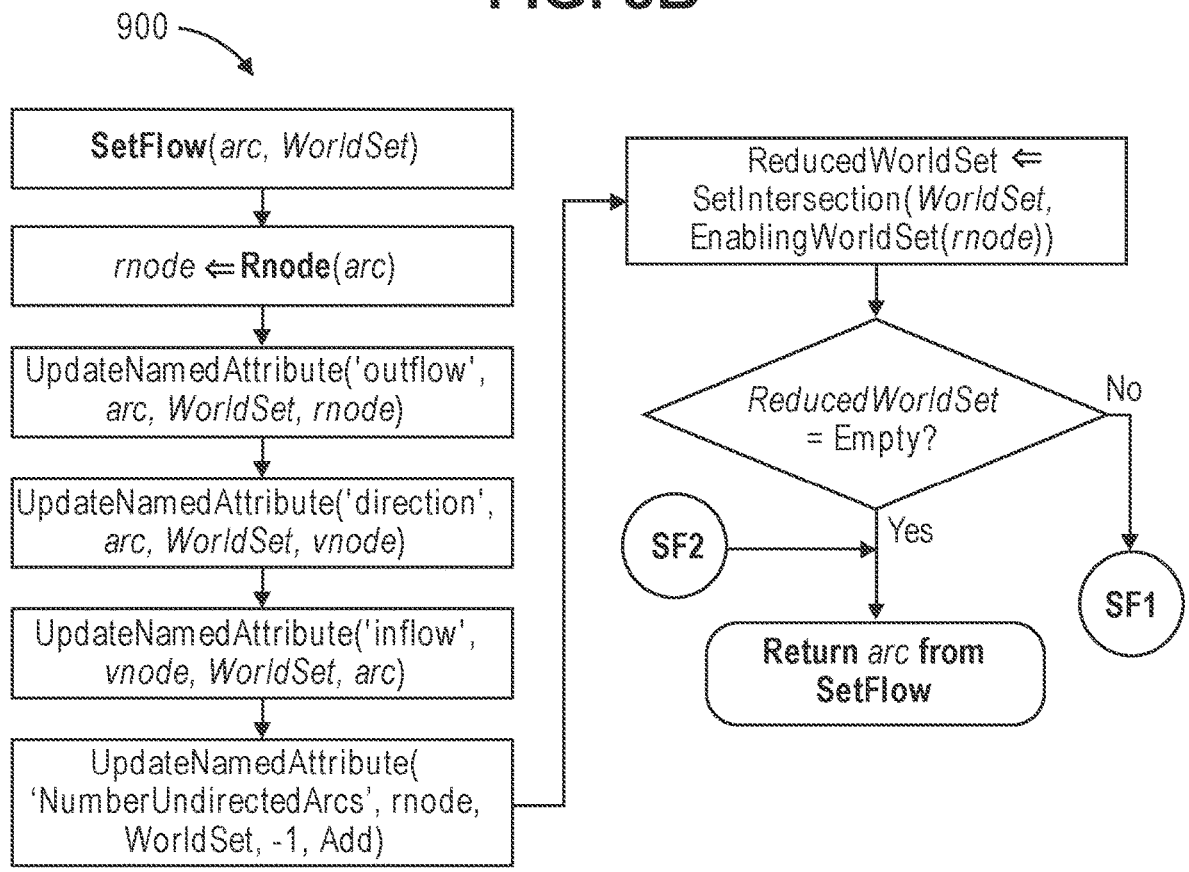
FIGS. 9A and 9B depict a flowchart of a method for setting an arc direction.
Figure 9B:
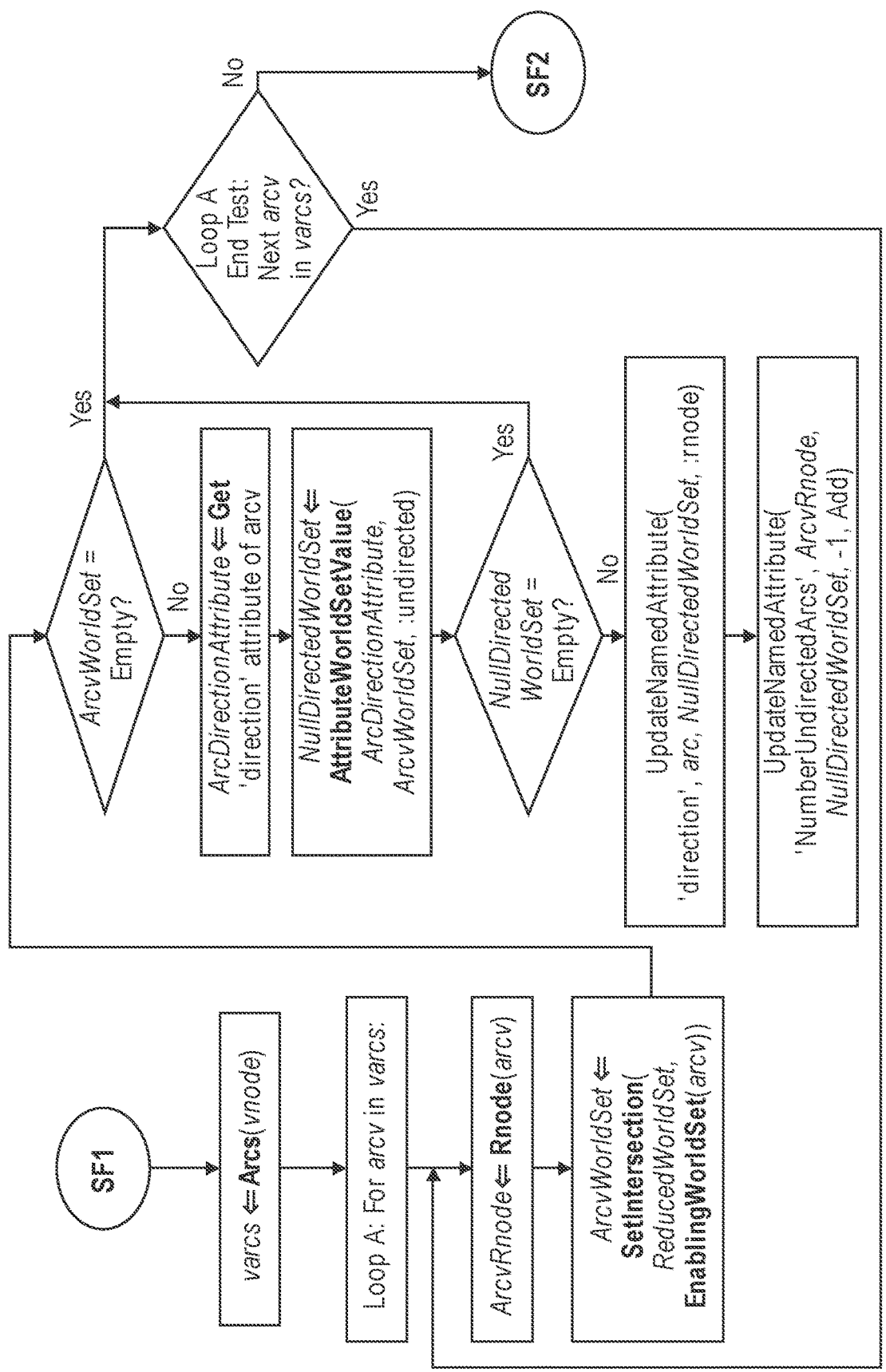

FIGS. 9A and 9B depict a flowchart of a method 900 for setting an arc direction. The method 900 may set an arc direction to a given world set due to finding a new data-dependent outflow attribute for an mode. The method 900 includes:

1—mode=Rnode(arc), vnode=Vnode(arc).
2—Update the outflow data-dependent attribute of the mode associated with this arc WorldSet pair.
3—Update the arc direction data-dependent attribute of the arc to point to the vnode in the WorldSet.
4—Update the vnode's inflow data-dependent attribute to be this arc in WorldSet.
5—Update the NumberUndirectedArcs data-dependent attribute of the mode by decreasing it by 1 in WorldSet.
6—ReduceWorldSet=SetIntersection(WorldSet, EnablingWorldSet(rnode)).
7—If (ReducedWorldSet is empty), go to step 9. Otherwise, go to step 8.
8—For each arcv in Arcs(vnode) (i.e., these are the arcs attached to the vnode end of the incoming arc to SetFlow), do the following:
   8.1—arcvrnode=Rnode(arcv). This is the mode at the end of the arcv.
   8.2—arcvWorldSet=Intersect(ReducedWorldSet, EnablingWorldSet(arcv)).
   8.3—Unless (arcvWorldSet=empty), do the following:
      8.3.1—NullDirectedWorldSet=world set of the undirected part of this arcv.
      8.3.2—Unless (NullDirectedWorldSet=empty), do the following:
         8.3.2.1—Update arc direction data-dependent attribute of arcv to point to mode for NullDirectedWorldSet.
         8.3.2.2—Reduce NumberUndirectedArcs data-dependent attribute of arcvrnode by 1 in NullDirectedWorldSet.
9—Return arc from SetFlow.

Figure 10:
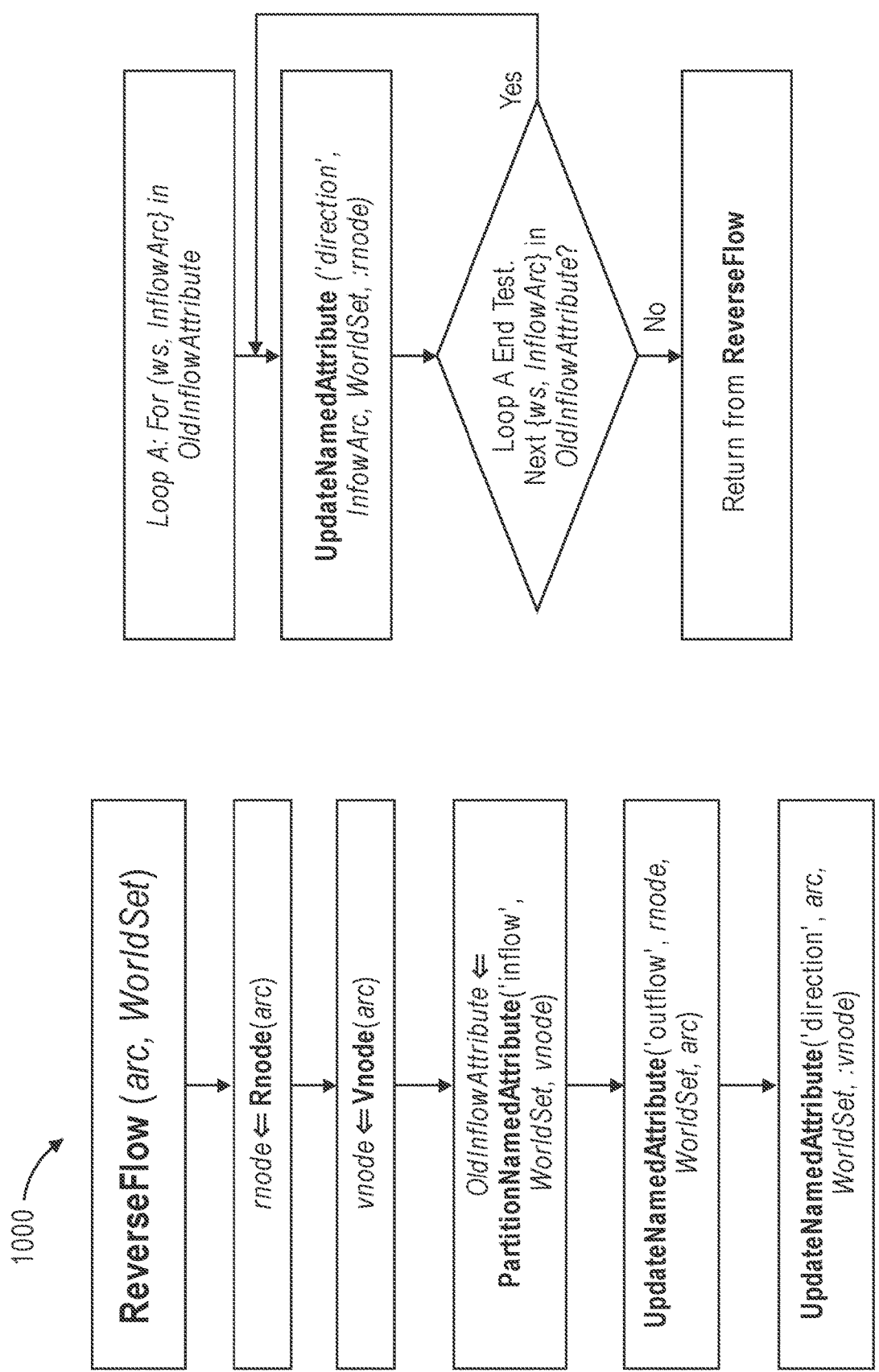
FIG. 10 depicts a flowchart of a method for reversing an arc direction.

FIG. 10 depicts a flowchart of a method 1000 for reversing an arc direction. The method 1000 may reverse an arc direction in a given world set. The method 1000 includes:

1—mode=Rnode(arc), vnode=Vnode(arc).
2—old-inflows=Intersect WorldSet with Vnode inflow data-dependent attribute. The inflow arcs and their associated world sets may be saved for the vnode of the arc in the ReverseFlow argument list.
3—Update the outflow data-dependent attribute of the mode associated with this arc.
4—Update the arc direction data-dependent attribute of the arc to point to the vnode in the WorldSet.
5—For each {ws, old-inflow-arc} pair in old-inflow, do the following:
   5.1—Update the arc direction data-dependent attribute of old-inflow-arc to point to its mode in world set ws.

Figure 11A:
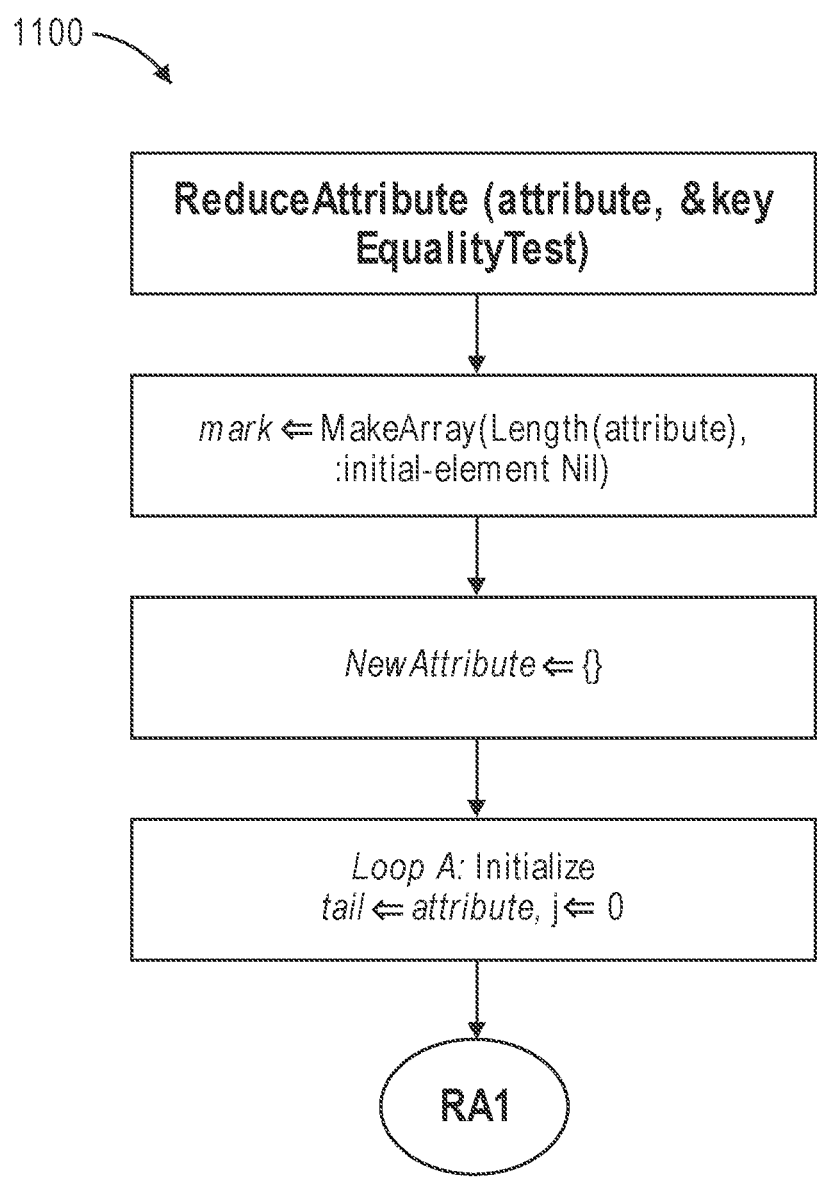
FIGS. 11A and 11B depict a flowchart of a method for reducing an attribute.
Figure 11B:
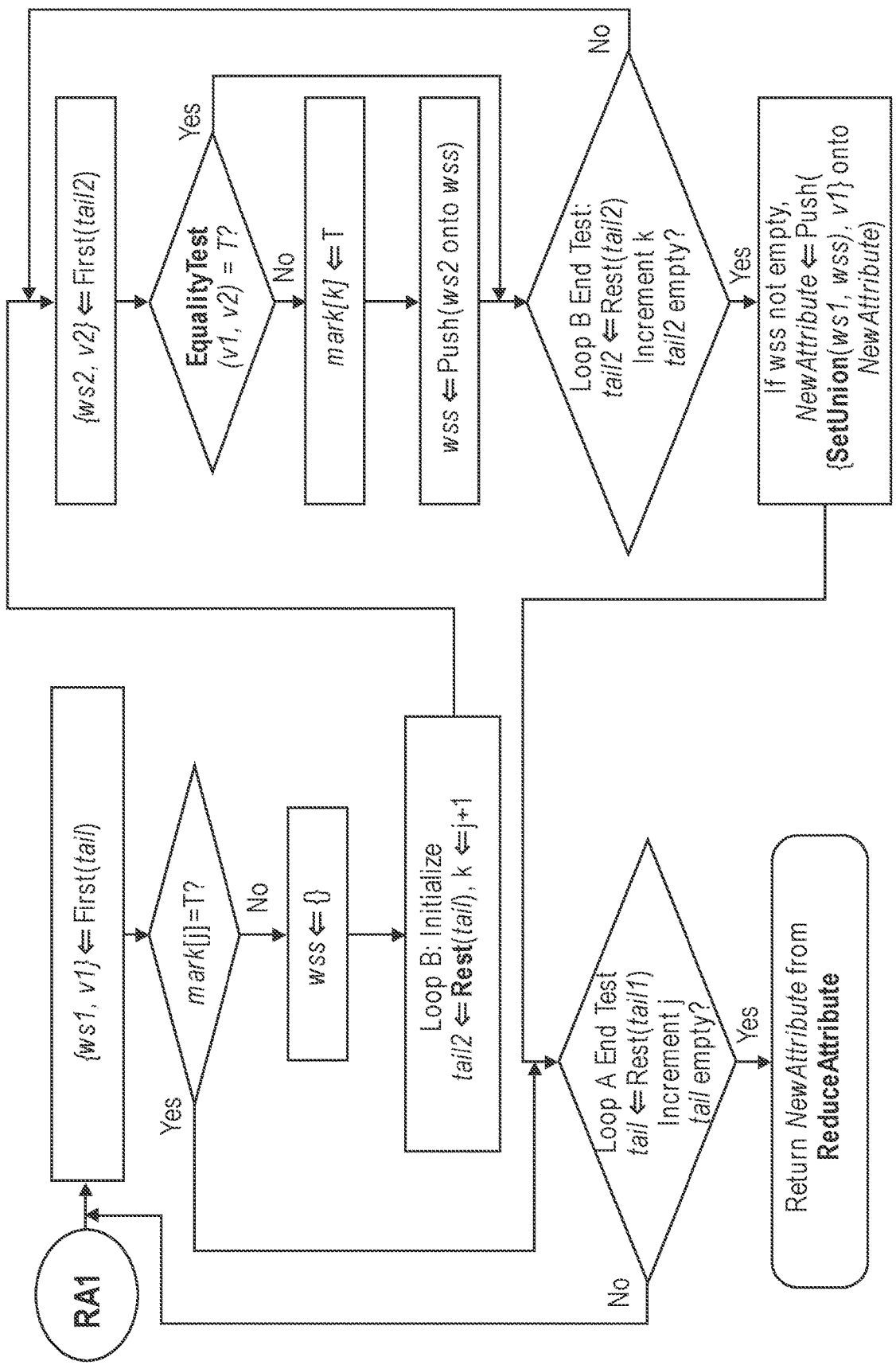

FIGS. 11A and 11B depict a flowchart of a method 1100 for reducing an attribute. Given a world set attribute that may have been modified, the method 1100 may combine one or more entries having equivalent values (e.g., according to an equality test) to restore the property of having distinct values and disjoint world sets. The method 1100 includes:

1—mark=MakeArray (Length(attribute), initial-element nil).
2—NewAttribute=.
3—Loop A; Initialize tail=attribute, j=0. Go to 3.1.
   3.1—{ws1, v1}=First(tail).
   3.2—If mark[j]=T, go to 3.3. Otherwise, go to 3.2.1.
      3.2.1—wss={ }.
      3.2.2—Loop B: Initialize tail2=Rest(tail), and k=j+1. Go to 3.2.2.1.
         3.2.2.1—{ws2, v2}=First(tail2).
         3.2.2.2—If EqualityTest(v1, v2), go to 3.2.2.3. Otherwise, go to 3.2.2.2.1.
            3.2.2.2.1—mark[k]=T.
            3.2.2.2.2=wss=Push(ws2 onto wss).
         3.2.2.3—If next Loop B, increment k, tail2=Rest(tail2), go to 3.2.2.1. Otherwise, go to 3.2.3.
      3.2.3—If wss is not empty, NewAttribute=Push{SetUnion(ws1, wss), v1} onto NewAttribute. Otherwise, Push {ws1, v1} onto NewAttribute.
   3.3—If Next Loop A, increment j and tail=Rest(tail) and go to 3.1. Otherwise, go to 4.
4—Return NewAttribute from ReduceAttribute.

The term/method SetUnion(set1, set2, . . . ) performs the union of the sets. When they are well-formed formulae, this performs the logical Or of the wffs. The term/method SetIntersection(set1, set2, . . . ) performs the intersection of the sets. When they are well-formed formulae, this performs the logical And of the wffs. The term/method SetDifference (set1, set2, . . . ) performs the set difference of the sets. When they are well-formed formulae, this performs the logical And of the first set with the negation of the logical union of the remaining wffs: ws[1] ^Not(ws[2] V ws[3] V . . . ). The term/method Not(wff) performs the logical negation of the supplied well-formed formula.

Figure 12:
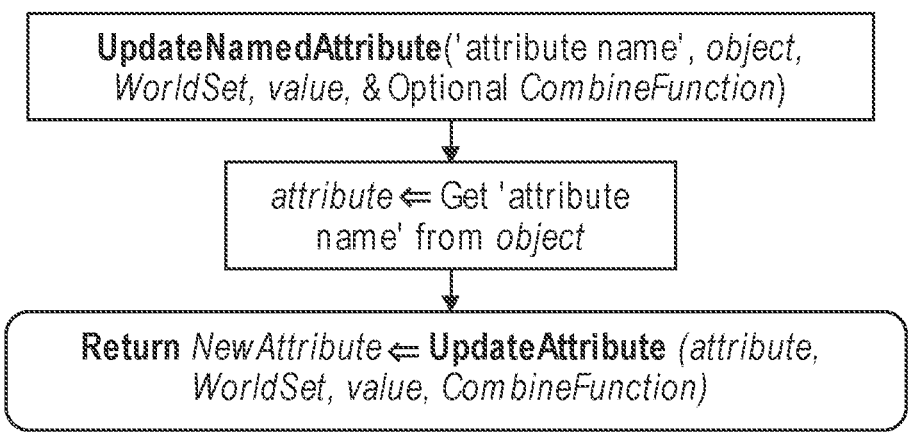
FIG. 12 depicts a flowchart of a method for updating a named attribute.

FIG. 12 depicts a flowchart of a method 1200 for updating a named attribute. The term/method UpdateNamedAttribute ('attribute name', object, WorldSet, value, and optional CombineFunction) updates the object attribute of the given name to combine the specified value for the specified WorldSet with the named attribute. The method 1200 includes:

1—Set attribute=Get 'attribute name' from object.
2—Return Newattribute by calling UpdateAttribute(attribute, WorldSet, value, CombineFunction).

Figure 13:
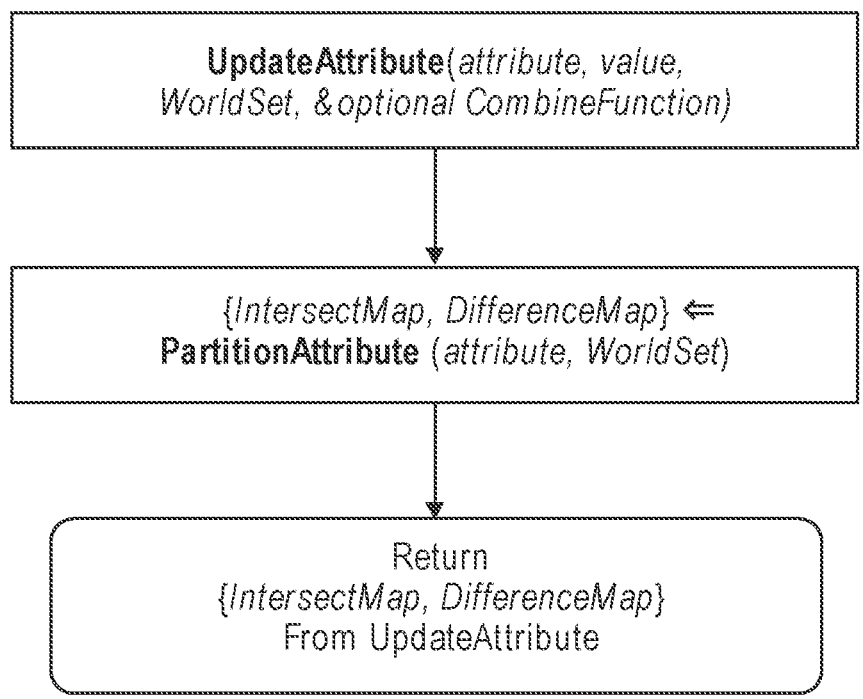
FIG. 13 depicts a flowchart of a method for updating an attribute.

FIG. 13 depicts a flowchart of a method 1300 for updating an attribute. The term/method UpdateAttribute(attribute, value, WorldSet, and Optional CombineFunction) updates the world set dependent attributed named 'object name' of object by combining the new value with any existing value(s) whose partitions intersect the given world set. The CombineFunction defaults to Replace.

Figure 14:
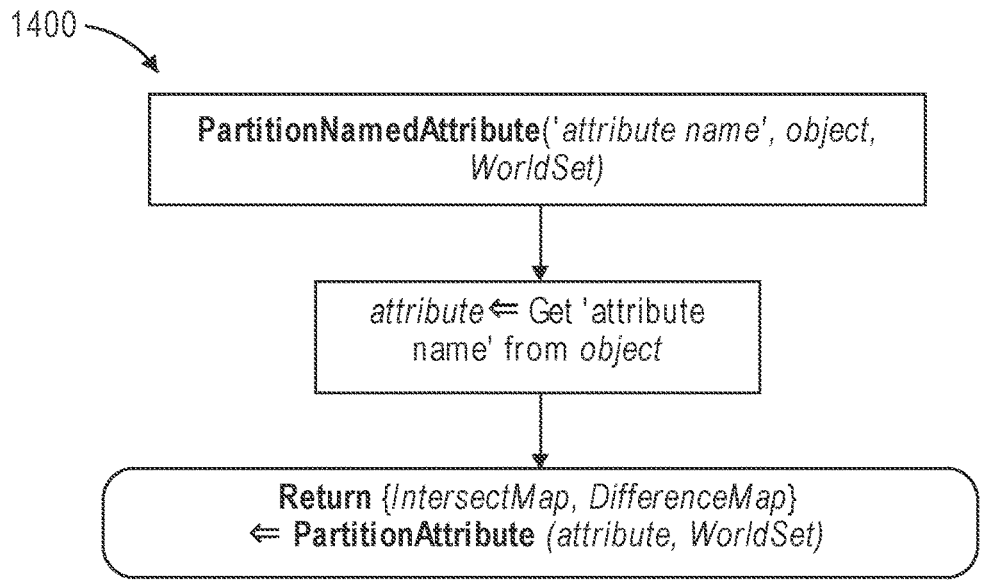
FIG. 14 depicts a flowchart of a method for partitioning a named attribute.

FIG. 14 depicts a flowchart of a method 1400 for partitioning a named attribute. The term/method PartitionNamedAttribute('attribute name', object, WorldSet) partitions the specified named world set dependent attribute of object into intersection and difference attributes with respect to the WorldSet by calling PartitionAttribute. The method 1400 includes:

1—Attribute=Get attribute with "attribute name' of object.
2—Return {IntersectionAttribute, DifferenceAttribute} from call to PartitionAttribute(attribute, WorldSet).

Figure 15:
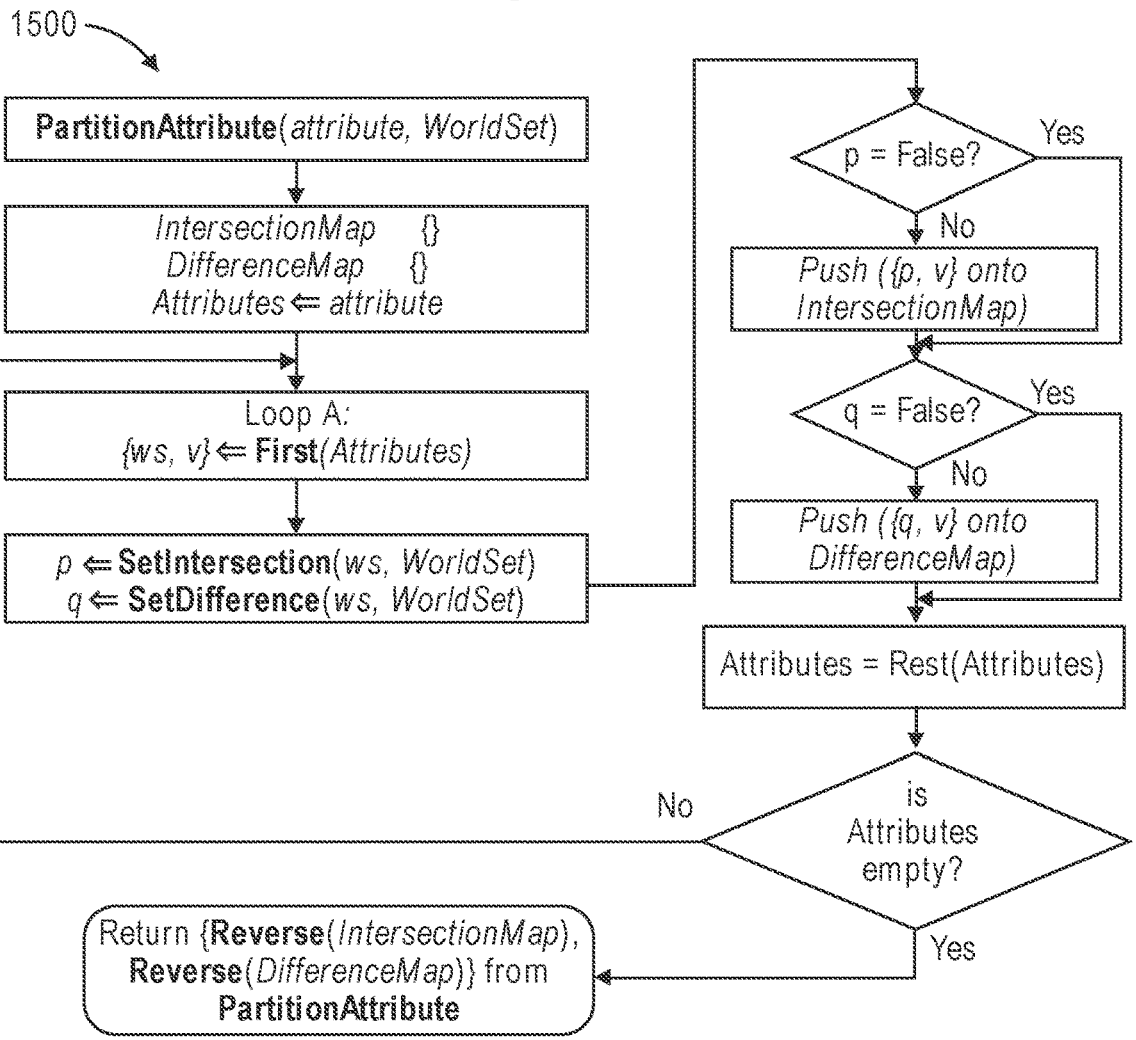
FIG. 15 depicts a flowchart of a method for partitioning an attribute.

FIG. 15 depicts a flowchart of a method 1500 for partitioning an attribute. The term/method PartitionAttribute (attribute, WorldSet) partitions the specified world set dependent attribute into intersection and difference attributes with respect to the WorldSet. The method 1500 includes:

1—IntersectionMap={ }, DifferenceMap={ }.
2—Loop A; {ws, v}=First(Attribute). Go to 2.1.
   2.1—p=SetIntersection(ws, WorldSet).
   2.2q=SetDifference(ws, Not(WorldSet)).

2.3—Unless p=False, push {p, v} onto Intersection Map.
2.4—Unless q=False, Push {q, v} onto Difference Map.
2.5—If Next Loop A, set {ws, v} next item in attribute and go to 2.1. Otherwise, go to 3.
3—Return {Reverse(IntersectionMap), Reverse(DifferenceMap)) from PartitionAttribute.

Figure 16:
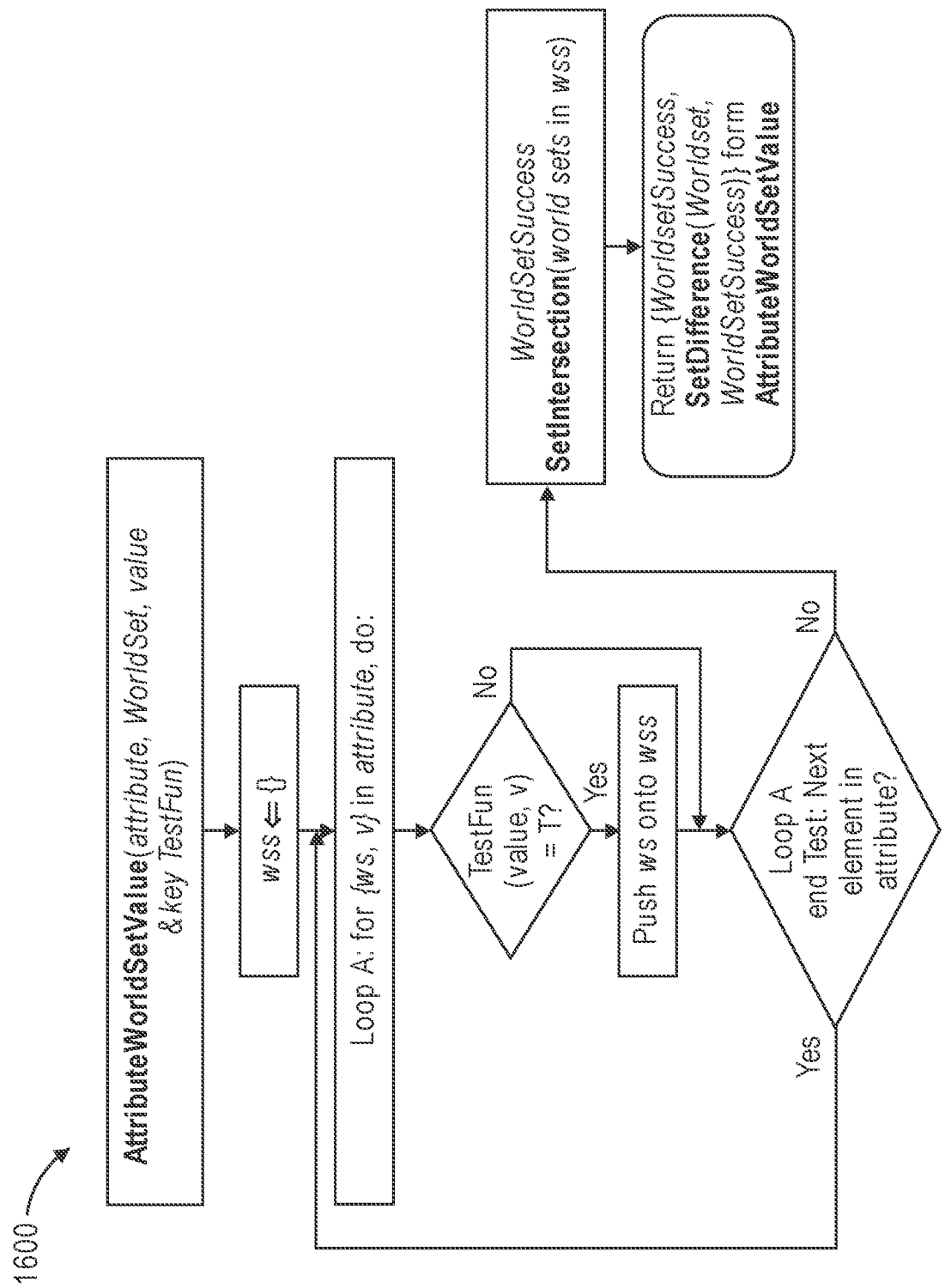
FIG. 16 depicts a flowchart of a method for determining an attribute world set value.

FIG. 16 depicts a flowchart of a method 1600 for determining an attribute world set value. The term/method AttributeWorldSetValue(attribute, WorldSet, value & key TestFun) partitions the given world set, returning multiple values. The values may include (1) the subset in which the world set attribute contains the given value, and (2) the subset in which it does not. The values in a world set attribute may be unique. Therefore, if the TestFun is equality, the given value can be associated with only one partition, and the answer is the intersection of the given world set with the world set associated with that partition. If, however, the TestFun is something other than equality, then multiple partitions may satisfy the test, and the answer may be the intersection of the given world set with the union of the associated WFFs. The method 1600 includes:

RelevantWorldSets=Collect ws[j] in attribute (i.e., in {ws[1]→val[1], ws[2]→val[2], ... } such that TestFun (value, val[j]) is true.
WorldSetSuccess=SetIntersection(world sets in RelevantWorldSets).
Return {WorldSetSuccess, SetDifference(WorldSet, WorldSetSuccess)} from AttributeWorldSetValue.

In at least one embodiment, flow in the bipartite graph may propagate starting with a first of the relation nodes in a specified world set. The specified world set is initially the enabling world set of the first relation node. Consequences of the propagation may then be returned. The consequences of the propagation may include a data-dependent attribute being a list of pairs. Each of the list of pairs is an arc and an associated world set where the arc is an outflow of the relation node that is attached to the arc.

Propagating flow may include partitioning the specified world set into a first partition and a second partition. At least one of the arcs connected to the first relation node is not directed towards the first relation node and thus is configured to be the outflow arc of the first relation node in the first partition. Each of the arcs connected to the first relation node is configured to be an inflow arc of the first relation node in the second partition.

Partitioning the specified world set into a first partition and a second partition may include marking a first arc of the at least one of the arcs in the first partition. The first arc is configured to be the outflow arc of the first relation node. Partitioning the specified world set may also include reversing a flow for a second arc of the each of the arcs in the second partition.

Marking the first arc in the first partition may include determining the variable node connected to the first arc, determining at least one of the inflow arcs and associated world set of the variable node, wherein the at least one of the inflow arcs is not marked, determining a third partition which is an intersection of the associated world set and the first partition, and recursively propagating the flow for the relation node and the third partition.

Reversing the flow for the second arc in the second partition may include determining a fourth partition, which is an intersection of the world set associated with the direction of the second arc and the second partition, reversing the direction of the second arc in the fourth partition, and recursively propagating the flow for the relation node which is connected to the second arc in the fourth partition.

Figure 17:
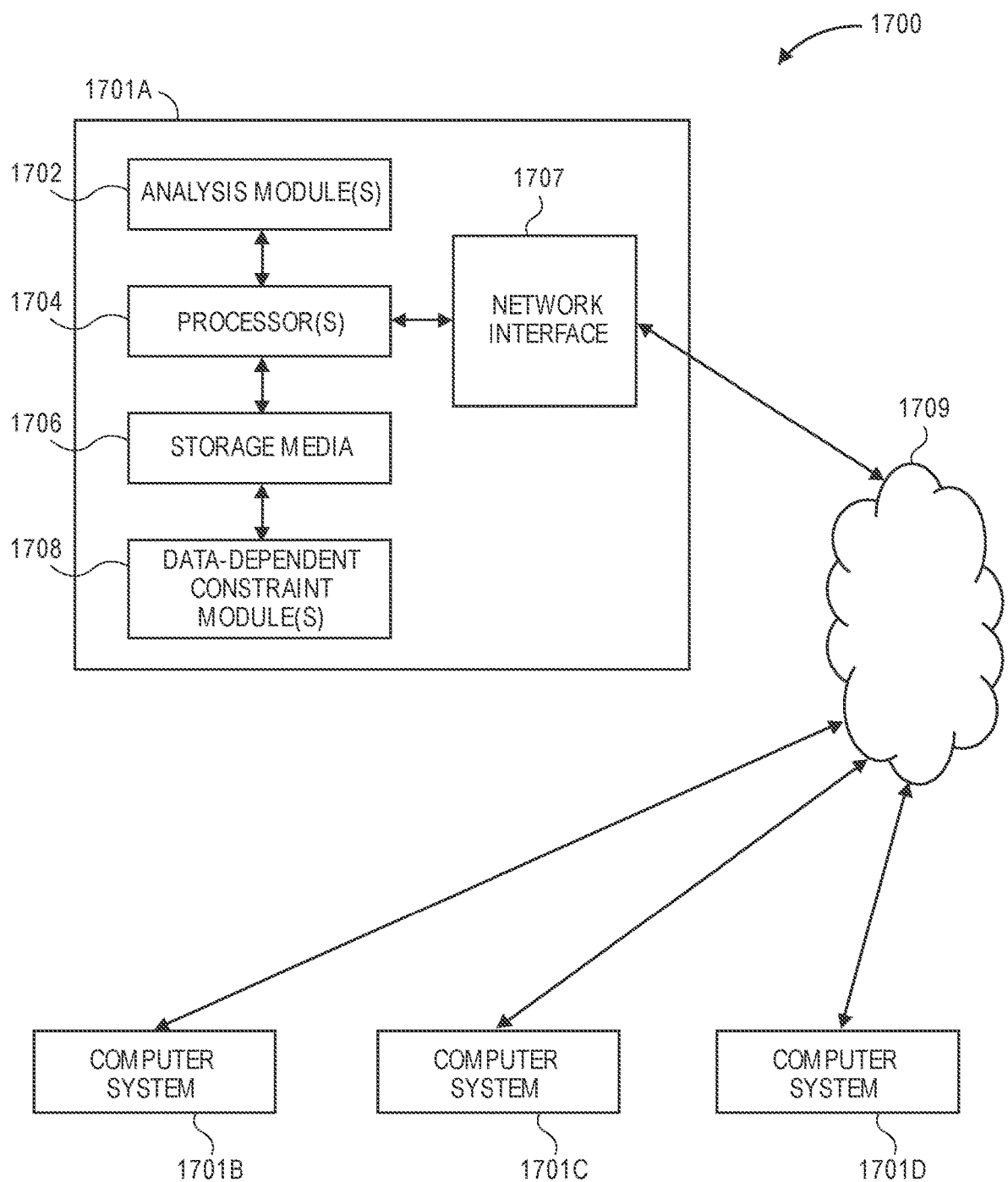
FIG. 17 depicts a schematic view of a computing system for performing one or more of the methods disclosed herein.

In some embodiments, the methods of the present disclosure may be executed by a computing system. FIG. 17 illustrates an example of such a computing system 1700, in accordance with some embodiments. The computing system 1700 may include a computer or computer system 1701A, which may be an individual computer system 1701A or an arrangement of distributed computer systems. In various embodiments, the computer system 1701A can implement a cloud computing environment. The computer system 1701A includes one or more analysis modules 1702 that are configured to perform various tasks according to some embodiments, such as one or more methods disclosed herein. To perform these various tasks, the analysis module 1702 executes independently, or in coordination with, one or more processors 1704, which is (or are) connected to one or more storage media 1706. The processor(s) 1704 is (or are) also connected to a network interface 1707 to allow the computer system 1701A to communicate over a data network 1709 with one or more additional computer systems and/or computing systems, such as 1701B, 1701C, and/or 1701D (note that computer systems 1701B, 1701C and/or 1701D may or may not share the same architecture as computer system 1701A, and may be located in different physical locations, e.g., computer systems 1701A and 1701B may be located in a processing facility, while in communication with one or more computer systems such as 1701C and/or 1701D that are located in one or more data centers, and/or located in varying countries on different continents). In various embodiments, computer systems 1701B, 1701C, and/or 1701D can represent computing systems utilized by users of the cloud computing environment.

A processor may include a microprocessor, microcontroller, processor module or subsystem, programmable integrated circuit, programmable gate array, or another control or computing device.

The storage media 1706 may be implemented as one or more computer-readable or machine-readable storage media. Note that while in the example embodiment of FIG. 17 storage media 1706 is depicted as within computer system 1701A, in some embodiments, storage media 1706 may be distributed within and/or across multiple internal and/or external enclosures of computing system 1701A and/or additional computing systems. Storage media 1706 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY® disks, or other types of optical storage, or other types of storage devices. Note that instructions may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 1700 contains one or more data-dependent constraint module(s) 1708. In the example of computing system 1700, computer system 1701A includes the data-dependent constraint module 1708. In some embodiments, a single data-dependent constraint module may be used to perform some aspects of one or more embodiments of the methods disclosed herein. In alternate embodiments, a plurality of data-dependent constraint modules may be used to perform some aspects of methods herein.

It should be appreciated that computing system 1700 is one example of a computing system, and that computing system 1700 may have more or fewer components than shown, may combine additional components not depicted in the example embodiment of FIG. 17, and/or computing system 1700 may have a different configuration or arrangement of the components depicted in FIG. 17. The various components shown in FIG. 17 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included in various embodiments.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. It will be appreciated that structural components and/or processing stages can be added or existing structural components and/or processing stages can be removed or modified. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "about" indicates that the value listed may be somewhat altered, as long as the alteration does not result in nonconformance of the process or structure to the present teachings. The present disclosure provides specific implementations without being exhaustive, and other implementations of the present teachings may be apparent to those skilled in the art from consideration of the specification and practice of the disclosure herein. It is intended that the specification and examples be considered as exemplary only, with a true scope and spirit of the present teachings being indicated by the following claims.

The invention claimed is:

1. A processor-based method of determining computational flow for a data-dependent constraint network for use during a design analysis of an engineering system, a design optimization of the engineering system, or both, the method comprising the steps of:

electronically constructing and storing a bipartite graph representing the data-dependent constraint network, the bipartite graph comprising a plurality of variable nodes and a plurality of relation nodes, the variable nodes and the relation nodes being interconnected by arcs, the variable nodes representing variables in a mathematical model of the engineering system, the relation nodes defining constraints between possible values of the variables, wherein a world set defines conditions on the relation nodes that determine an applicability of the constraints during the design analysis of the engineering system, the design optimization of the engineering system, or both;

recording the world set for each user-selected variable node representing a variable in the mathematical model in which the variable is independent;

determining and recording a plurality of world-set dependent attributes for the variable nodes, the relation nodes, the arcs, and the bipartite graph, the world-set dependent attributes comprising flow-states of the variable nodes, inflows of the variable nodes, outflow arcs of the relation nodes, directions of the arcs, and over-constrained relation nodes for the bipartite graph;

updating the world-set dependent attribute for the directions for the arcs, the world-set dependent attribute for the inflows for the variable nodes, and the world-set dependent attribute for the outflow arcs for the relation nodes such that the data-dependent constraint network is in a consistent state, such that at most one of the arcs is pointing to each variable node in any world, and at least one of the arcs is directed from one of the relation nodes to one of the variable nodes in a non-null world; and outputting electronically, for each variable node, the flow-states of each variable node in all worlds comprising an enabling world set of each variable node.

2. The method of claim 1, further comprising recording, in the world-set dependent attribute for the over-constrained relation nodes of the bipartite graph, the relation nodes for which it is not possible to determine the outflow arc for at least one of the world sets, the at least one of the world sets being a subset of an enabling world set of each relation node.

3. The method of claim 1, further comprising:

propagating flow in the bipartite graph starting with a first relation node of the relation nodes in a specified world set, wherein the specified world set is initially the enabling world set of the first relation node; and returning consequences of the propagating flow.

4. The method of claim 3, wherein the consequences of the propagating flow include a data-dependent attribute including a list of pairs, wherein each of the list of pairs includes an arc and an associated world set, wherein the arc is an outflow arc of the relation node that is attached to the arc.

5. The method of claim 3, wherein the propagating flow further comprises partitioning the specified world set into a first partition and a second partition, wherein at least one of the arcs connected to the first relation node is not directed towards the first relation node such that the at least one of the arcs is configured to be the outflow arc of the first relation node in the first partition, and wherein each of the at least one of the arcs connected to the first relation node is configured to be an inflow arc of the first relation node in the second partition.

6. The method of claim 5, wherein partitioning the specified world set into the first partition and the second partition further comprises:
   marking a first arc of the at least one of the arcs in the first partition, wherein the first arc is configured to be the outflow arc of the first relation node; and
   reversing a flow for a second arc of the at least one of the arcs in the second partition.

7. The method of claim 6, wherein marking the first arc in the first partition comprises:
   determining the variable node connected to the first arc;
   determining at least one of the inflow arcs and an associated world set of the variable node, wherein the at least one of the inflow arcs is not marked;
   determining a third partition which is an intersection of the associated world set and the first partition; and
   recursively propagating the flow for the first relation node and the third partition.

8. The method of claim 6, wherein reversing the flow for the second arc in the second partition comprises:
   determining a fourth partition, which is an intersection of the world set associated with the direction of the second arc and the second partition;
   reversing the direction of the second arc in the fourth partition; and
   recursively propagating the flow for the first relation node, wherein the first relation node is connected to the second arc in the fourth partition.

9. The method of claim 1, wherein the engineering system comprises a physical object selected from the group consisting of an aircraft, a spacecraft, a launch vehicle, a ground vehicle, a marine vehicle, an autonomous vehicle, and a weapons system.

10. The method of claim 9, wherein the engineering system comprises an organization of physical objects selected from the group consisting of a combat system, a civic organization, and a fleet of autonomous vehicles.

11. A computing system, comprising:
   one or more processors; and
   a memory system comprising one or more non-transitory computer-readable media storing instructions that, when executed by at least one of the one or more processors, cause the computing system to perform operations, the operations comprising:
      electronically constructing and storing a bipartite graph representing a data-dependent constraint network, the bipartite graph comprising a plurality of variable nodes and a plurality of relation nodes, the variable nodes and the relation nodes being interconnected by arcs, the variable nodes representing variables in a mathematical model of an engineering system, the relation nodes defining constraints between possible values of the variables, wherein a world set defines conditions on the relation nodes that determine an applicability of the constraints during a design analysis of the engineering system, a design optimization of the engineering system, or both;
      recording the world set for each user-selected variable node representing a variable in the mathematical model in which the variable is independent;
      determining and recording a plurality of world-set dependent attributes for the variable nodes, the relation nodes, and the arcs, the bipartite graph, the world-set dependent attributes comprising flow-states of the variable nodes, inflows of the variable nodes, outflow arcs of the relation nodes, directions of the arcs, and over-constrained relation nodes for the bipartite graph;
      updating the world-set dependent attribute for the directions for the arcs, the world-set dependent attribute for the inflows for the variable nodes, and the world-set dependent attribute for the outflow arcs for the relation nodes such that the data-dependent constraint network is in a consistent state, such that at most one of the arcs is pointing to each variable node in any world, and at least one of the arcs is directed from one of the relation nodes to one of the variable nodes in a non-null world; and
      outputting electronically, for each variable node, the flow-states of each variable node in all worlds comprising an enabling world set of each variable node.

12. The computing system of claim 11, wherein the operations further comprise recording, in the world-set dependent attribute for the over-constrained relation nodes of the bipartite graph, the relation nodes for which it is not possible to determine the outflow arc for at least one of the world sets, the at least one of the world sets being a subset of an enabling world set of each relation node.

13. The computing system of claim 11, wherein the operations further comprise:
   propagating flow in the bipartite graph starting with a first relation node of the relation nodes in a specified world set, wherein the specified world set is initially the enabling world set of the first relation node; and
   returning consequences of the propagating flow.

14. The computing system of claim 13, wherein the consequences of the propagating flow include a data-dependent attribute including a list of pairs, wherein each of the list of pairs includes an arc and an associated world set, wherein the arc is an outflow arc of the relation node that is attached to the arc.

15. The computing system of claim 13, wherein the propagating flow further comprises partitioning the specified world set into a first partition and a second partition, wherein at least one of the arcs connected to the first relation node is not directed towards the first relation node such that the at least one of the arcs is configured to be the outflow arc of the first relation node in the first partition, and wherein each of the at least one of the arcs connected to the first relation node is configured to be an inflow arc of the first relation node in the second partition.

16. The computing system of claim 15, wherein partitioning the specified world set into the first partition and the second partition further comprises:
   marking a first arc of the at least one of the arcs in the first partition, wherein the first arc is configured to be the outflow arc of the first relation node; and reversing a flow for a second arc of the at least one of the arcs in the second partition.

17. The computing system of claim 16, wherein marking the first arc in the first partition comprises:
determining the variable node connected to the first arc;
determining at least one of the inflow arcs and an associated world set of the variable node, wherein the at least one of the inflow arcs is not marked;
determining a third partition which is an intersection of the associated world set and the first partition; and
recursively propagating the flow for the first relation node and the third partition.

18. The computing system of claim 16, wherein reversing the flow for the second arc in the second partition comprises:
determining a fourth partition, which is an intersection of the world set associated with the direction of the second arc and the second partition;
reversing the direction of the second arc in the fourth partition; and
recursively propagating the flow for the first relation node, wherein the first relation node is connected to the second arc in the fourth partition.

19. The computing system of claim 11, wherein the engineering system comprises a physical object selected from the group consisting of an aircraft, a spacecraft, a launch vehicle, a ground vehicle, a marine vehicle, an autonomous vehicle, and a weapons system.

20. The computing system of claim 11, wherein the engineering system comprises an organization of physical objects selected from the group consisting of a combat system, a civic organization, and a fleet of autonomous vehicles.

* * * * *